(12) United States Patent
Wolfman et al.

(10) Patent No.: US 11,194,831 B2
(45) Date of Patent: Dec. 7, 2021

(54) SYSTEMS, APPARATUS, AND METHODS FOR DATA INTEGRATION OPTIMIZATION

(71) Applicant: Informatica LLC, Redwood City, CA (US)

(72) Inventors: Gadi Wolfman, Herzeliya (IL); Kobi Gol, Tel Aviv (IL); Jaganmohan Reddy Kancharla, Bengaluru (IN)

(73) Assignee: INFORMATICA LLC, Redwood City, CA (US)

(*) Notice: Subject to any disclaimer, the term of this patent is extended or adjusted under 35 U.S.C. 154(b) by 92 days.

(21) Appl. No.: 16/715,414

(22) Filed: Dec. 16, 2019

(65) Prior Publication Data

US 2021/0182305 A1    Jun. 17, 2021

(51) Int. Cl.
*G06F 17/00* (2019.01)
*G06F 16/25* (2019.01)
*G06F 16/28* (2019.01)

(52) U.S. Cl.
CPC .......... *G06F 16/254* (2019.01); *G06F 16/287* (2019.01)

(58) Field of Classification Search
CPC ........ G06F 16/13; G06F 16/24; G06F 16/156; G06F 16/254; G06N 3/00; G06N 5/00; G05B 13/00
See application file for complete search history.

(56) References Cited

U.S. PATENT DOCUMENTS 6,339,775 B1    1/2002  Zamanian et al.
8,380,657 B2    2/2013  Shaik et al.
2005/0251501 A1* 11/2005 Phillips ................. G06F 16/958
2011/0252011 A1* 10/2011 Morris .................. H04L 12/185
                                                                 707/706
2012/0290518 A1* 11/2012 Flinn ................. G06F 16/24575
                                                                 706/12

(Continued)

OTHER PUBLICATIONS

"Subgraph Isomorphism Problem," Wikipedia, https://en.wikipedia.org/w/index.php?title=Subgraph_isomorphism_problem&oldid=924030563, Nov. 1, 2019, 4 pages.

(Continued)

*Primary Examiner* — Hung D Le
(74) *Attorney, Agent, or Firm* — Amardeep S. Grewal; Richard Graham; Reed Smith LLP

(57) ABSTRACT

Systems, methods, and techniques for optimizing a plurality of data integration tasks within a data integration collection by identifying, as a sub-set of the plurality of data integration tasks, a plurality of point-to-point data integration tasks defining a data integration transformation plan to include: generating one or more publication data integration tasks comprising publishing from each respective data source of the plurality of point-to-point data integration tasks to generate a single publication topic; and generating one or more subscription data integration tasks causing each respective target of the plurality of point-to-point data integration tasks to subscribe to the single publication topic; and generating a set of optimization instructions configured to cause the at least one computer to implement the data integration transformation plan; and executing the set of optimization instructions to generate the one or more publication data integration tasks and the one or more subscription tasks.

20 Claims, 22 Drawing Sheets

(56) References Cited

U.S. PATENT DOCUMENTS

| | | | |
|---|---|---|---|
| 2013/0019018 A1* | 1/2013 | Rice | H04L 12/66 |
| | | | 709/226 |
| 2015/0059324 A1* | 3/2015 | Grussmann | F01N 13/185 |
| | | | 60/323 |
| 2015/0207677 A1* | 7/2015 | Choudhury | H04L 47/12 |
| | | | 370/254 |

OTHER PUBLICATIONS

"Graph Rewriting," Wikipedia, https://en.wikipedia.org/w/index.php?title=Graph_rewriting&oldid=914359137, Sep. 6, 2019, 5 pages.

\* cited by examiner

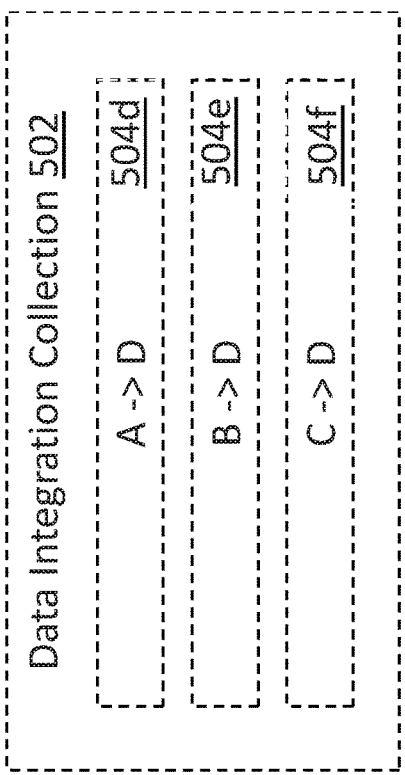
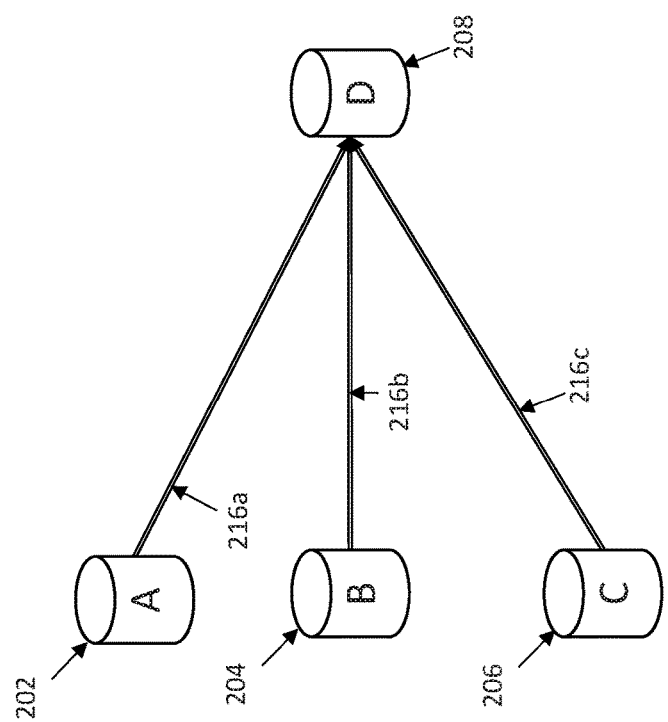
FIG. 8

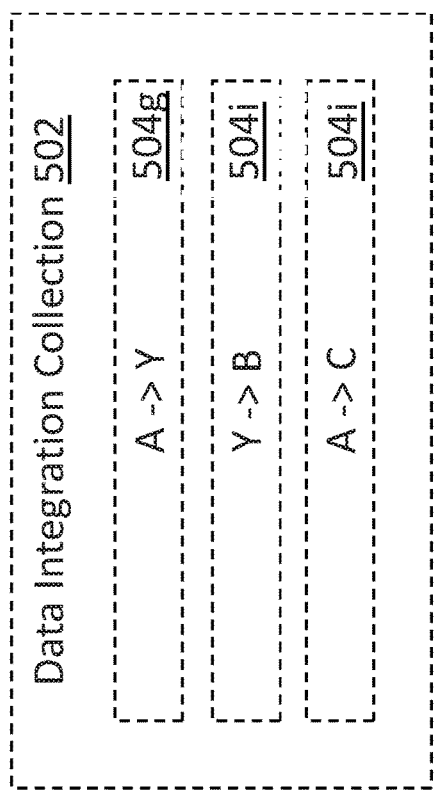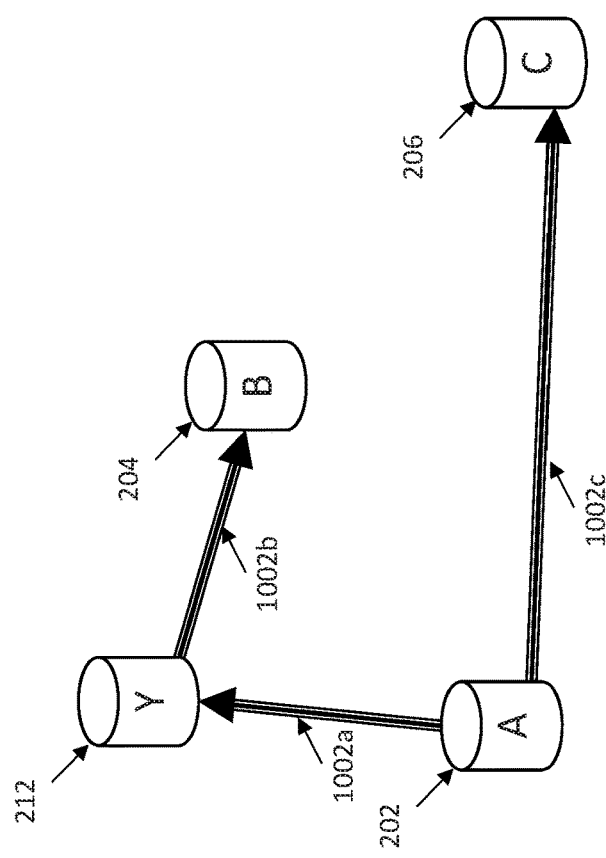
FIG. 10

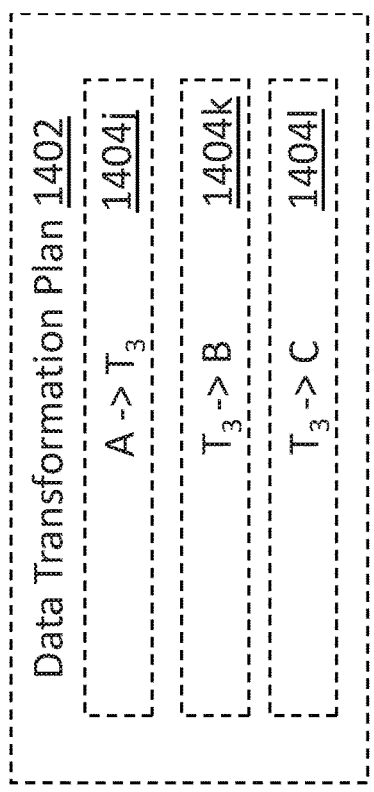
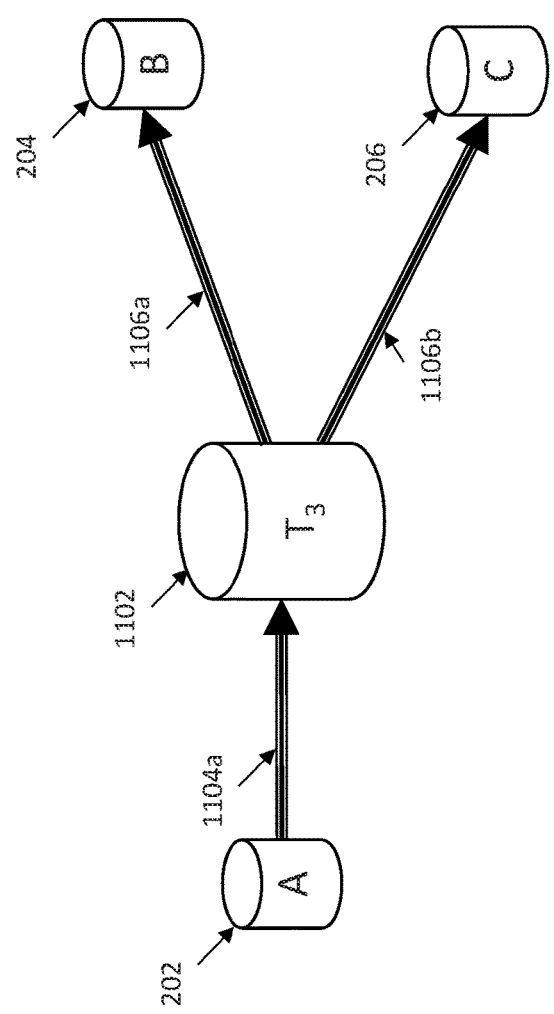
FIG. 11

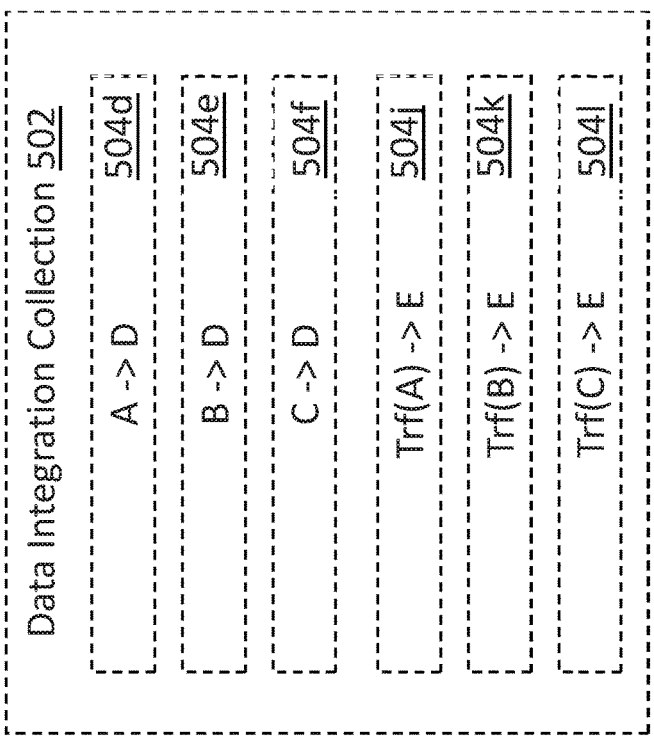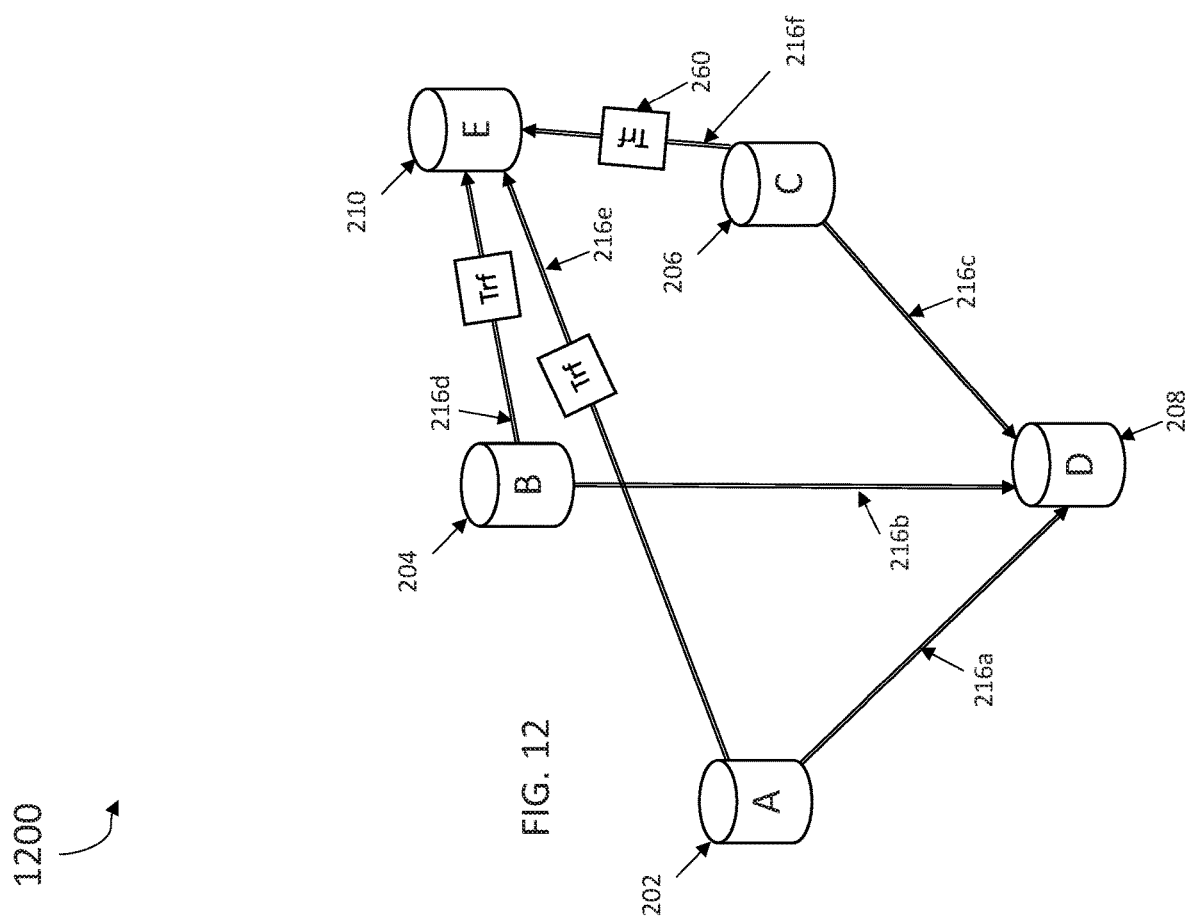
FIG. 12

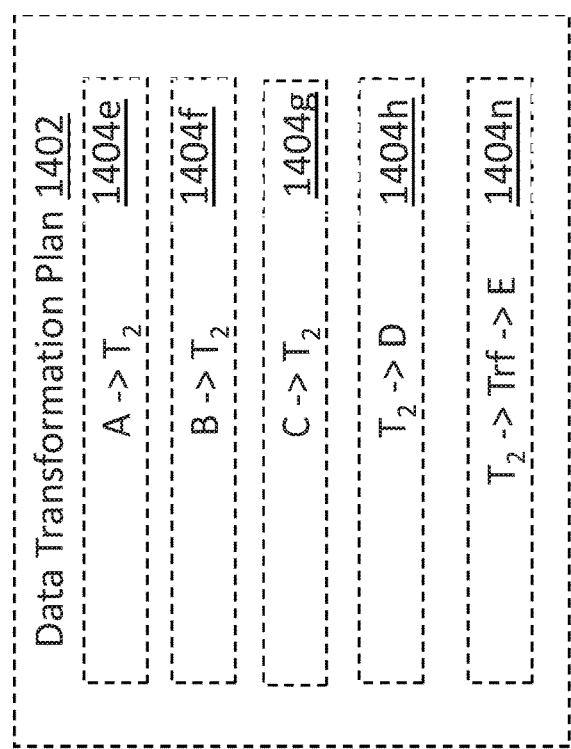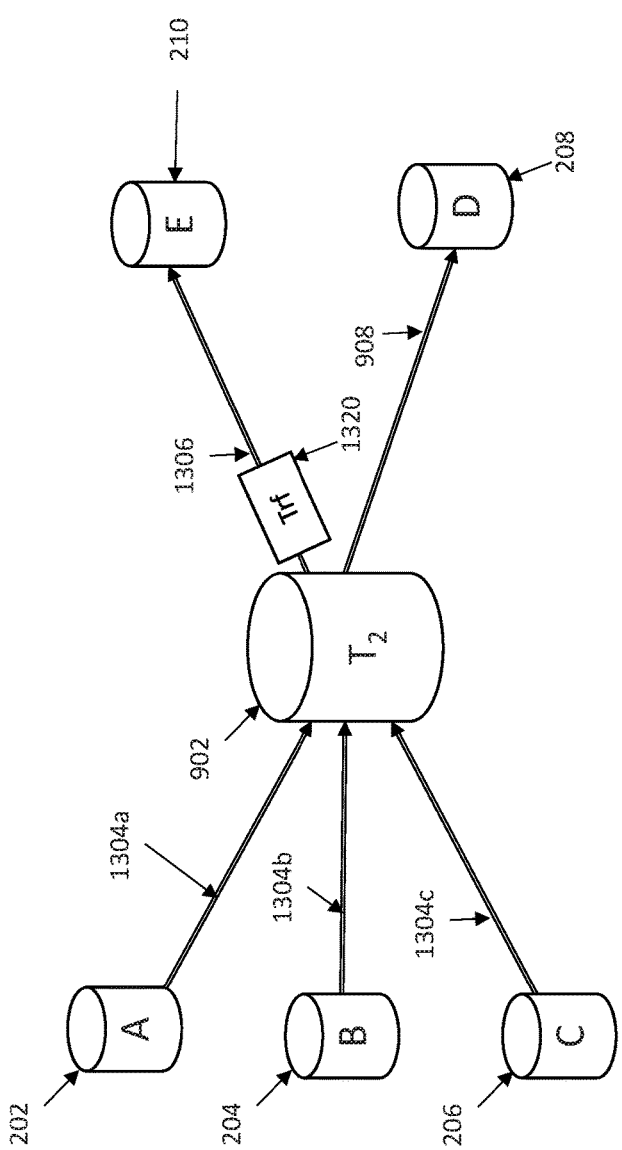
FIG. 13A

Data Transformation Plan 1402

| 1404a | A -> $T_1$ |
| 1404b | $T_1$ -> B |
| 1404c | $T_1$ -> C |
| 1404d | $T_1$ -> D |
| 1404e | A -> $T_2$ |
| 1404f | B -> $T_2$ |
| 1404i | A -> $T_3$ |
| 1404k | $T_3$ -> B |
| 1404l | $T_3$ -> C |
| 1404g | C -> $T_2$ |
| 1404h | $T_2$ -> D |
| 1404m | Trf(C) -> $T_2$ |
| 1404n | $T_2$ -> E |

FIG. 14

| KEY 1810 | VALUE 1820 |
|---|---|

| KEY 1910 | VALUE 1920 |
|---|---|
| HASH(A) | TASK(A -> B), TASK(A -> C), TASK(A -> D) |
| HASH(E) | TASK(E -> F) |

| KEY 2210 | VALUE 2220 |
|---|---|
| HASH(D) | TASK(A -> D),<br>TASK(B -> D),<br>TASK(C -> D) |
| HASH(F) | TASK(G -> F) |
2200
FIG. 22
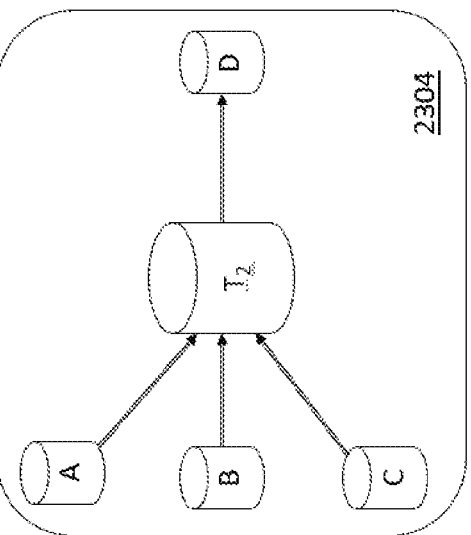
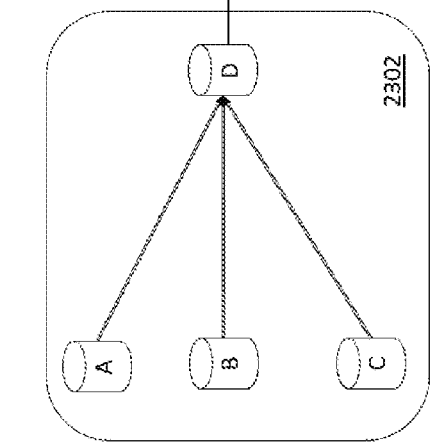
2300
FIG. 23

SYSTEMS, APPARATUS, AND METHODS FOR DATA INTEGRATION OPTIMIZATION

FIELD

This disclosure is generally related to data analytics and data informatics, and in particular to data integration domain, data analytics, and, in particular, to automatically optimizing a data integration collection.

BACKGROUND

In the modern economy, data stores are often the most valuable asset a firm may possess. Many highly valuable data stores store extremely large amounts of data, in many disparate physical data storage facilities, each containing numerous separate and distinct data stores, which themselves contain large amounts of data in various forms, such as files, relational databases, hierarchical databases, non-relational databases, and the like.

A firm's data store may be interconnected by a network, or multiple networks, with a number of application servers and workstations running applications that interact with, operate on, and retrieve data from the firm's data store by interacting with, operating on, and retrieving data from specific individual data sources, e.g., files, specific databases, or specific datasets, such as database tables, specific database table columns, hierarchies, sub-hierarchies, non-relational data units, or other individual data storage units. An application may so create, manage, or rely upon various data integration tasks between many different datasets stored within a data store's data storage facilities. And such applications may also create new data structures within one or more data stores of the data store, that themselves are the source for other applications or data sources.

Data use trends indicated that the more data a firm can collect and make efficient use of its data, and better it is ability to conduct operations, the better the firm is able to support its customers and clients. Thus, firms are expending large amounts of resources and time to analyze and understand their data.

Data integration tasks, such as extraction, transformation, and loading data between data sources and between data sources and applications can be described in a computer-parsable language, e.g., Transformation Definition Language (TDL), that concisely describes and characterizes data transformations within data stores. Firms may employ various tools for creating, maintaining, and governing a data store.

BRIEF DESCRIPTION OF THE DRAWINGS

FIG. 8 is a functional diagram illustrating aspects of a point-to-point data integration in accordance with this disclosure.

FIG. 10 is a functional diagram illustrating aspects of a point-to-point data integration in accordance with this disclosure.

FIG. 11 is a functional diagram illustrating aspects of a pub/sub integration in accordance with this disclosure.

FIG. 12 is a functional diagram illustrating aspects of a point-to-point data integration in accordance with this disclosure.

FIGS. 13A & 13B are functional diagrams illustrating aspects of a pub/sub integration in accordance with this disclosure.

FIG. 14 illustrates aspects of a data integration transformation plan in accordance with this disclosure.

FIG. 22 is an illustration of an exemplary populated integration map according with this disclosure.

FIG. 23 is an illustration of a data integration optimization in accordance with this disclosure.

DETAILED DESCRIPTION

Figure 1:
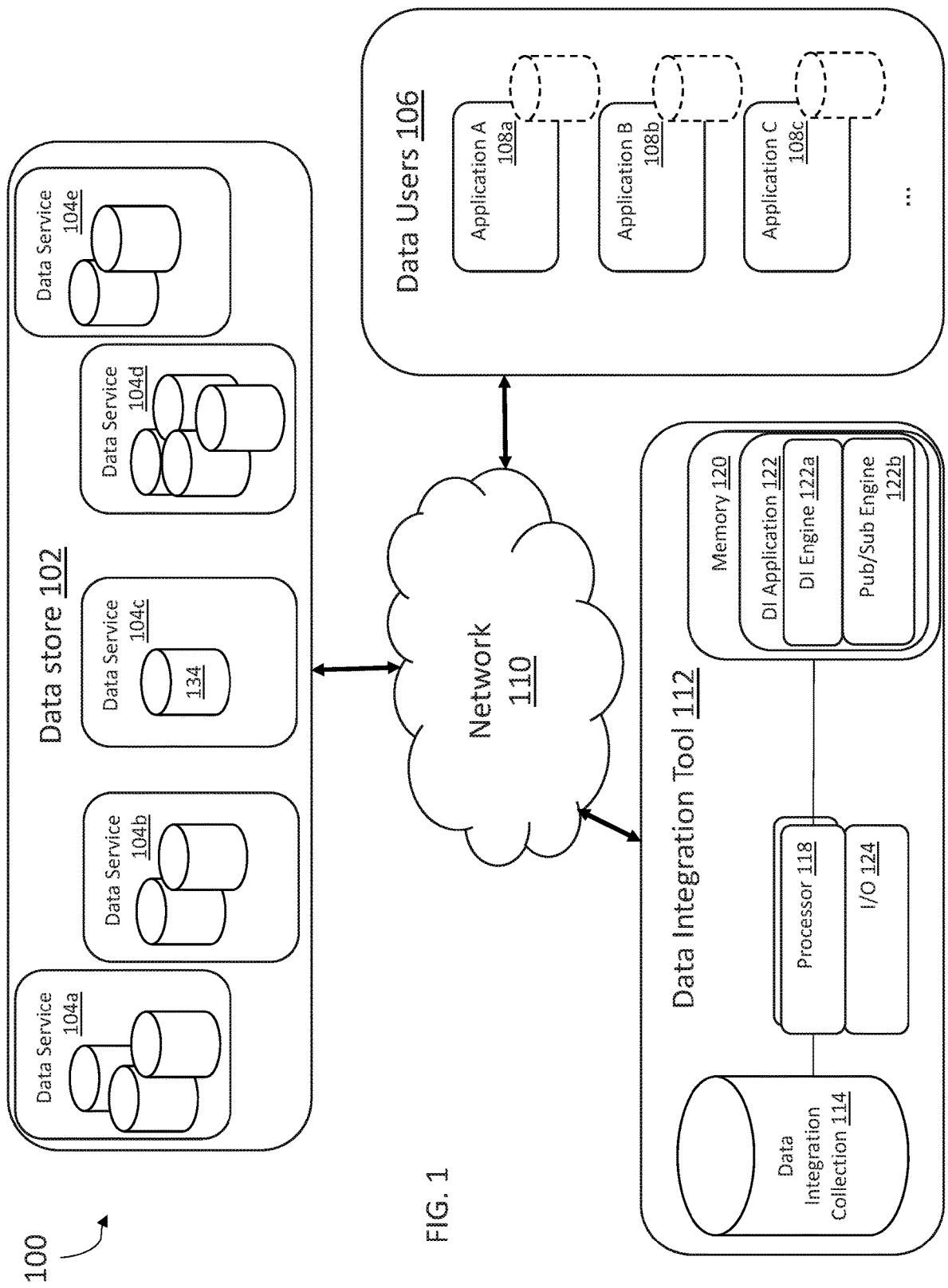
FIG. 1 is a functional diagram illustrating aspects of a data integration tool in accordance with this disclosure.

Disclosed are one or more embodiments that incorporate features of this invention. The disclosed embodiment(s) merely exemplify the invention. The scope of the invention is not limited to the disclosed embodiments. Rather, the invention is defined by the claims hereto.

Firms may employ various tools for creating, maintaining, and governing a data store. One such tool is a data integration collection, which may include among other things a description of a firm's data integration tasks in, e.g., TDL, or another data integration language as described below, and may also include one or more interfaces for accessing, creating, modifying, and deleting data a firm's data integration tasks.

Given the ad hoc nature in which many data integration tasks arise in a firm's data store, individual data units may be stored in duplicative locations by the various applications that rely on such data. And the ad hoc nature of creating data integration tasks within a data store leads to "integration hairballs" that are not scalable, and therefore inefficient in terms of resources consumed, and also difficult and costly to maintain and govern. Such integration hairballs arise when a data source within a data store is used multiple times or for unrelated purposes, e.g., by multiple applications or processes.

An exemplary basic data integration task includes extracting data from a source, performing a transformation on the data, and then loading the transformed data to a target. This process is succinctly described, e.g., in TDL, among other suitable languages. The various data integration tasks of a firm may be cataloged in a data integration collection, which may include for each data integration tasks, a description a source, one or more transformations, and a target. A firm may create, delete, and manage such data integration tasks using various data integration tools that interact or components of a data store management platform. For example, Informatica's Intelligent Cloud Services provides management tools and APIs for managing a data store in various cloud configurations.

In some embodiments, a data integration tool executes in a cloud environment, which may exist in a hybrid environment or a fully off-premises environment. A data store provides an API, e.g., REST API, which is configured to provide access to client processes seeking to access information from a data store. A data integration tool may be configured create, update, delete data integration tasks, and may also be used for other tasks, such as configuring permissions associated with a data integration task. In interrelated embodiments, a data store may provide one or more APIs; e.g., in an embodiment a data store provides a Java Database Connectivity (JDBC) API. Metadata describing data and data integration tasks may be queried, e.g., using SQL queries.

Upon reading this disclosure one will readily appreciate that an embodiment of a data integration tool, e.g., data integration tool 112, includes instruction, e.g., instructions describing DI application 122, configured to cause a computing device to interface to and configure data integration tasks within a data store, e.g., data store 102, which may be a cloud based data store. One will further appreciate that instructions in accordance with this disclosure may take many forms in many languages, e.g., in an embodiment a data integration tool is largely executes software coded instructions written in Java and C++. One will also appreciate that any particular embodiment of instructions in accordance with this disclosure may be written in a single language or in a variety of languages, as is left to a designer based on design considerations specific to an application. One will further appreciate that, upon reading this disclosure, generating instructions embodying aspects of this disclosure may be accomplished using understood software development techniques.

FIG. 1 illustrates various aspects 100 of an exemplary firm's data processing resources. A data store 102 comprises a plurality of data services, e.g., 104a-104e, each comprising one or more data sources, e.g., 134, which are relied upon by various data users, e.g., Applications A-C 108a-108c, all of which is interconnected by a network 110 (which may be multiple networks, and may include the Internet). These aspects may be geographically collocated or may be geographically distributed, and each respective application, e.g., 108a-108c, may be a part of or be integrated with one or more data sources, e.g., 134, of the data store 102. In an embodiment, a firms data processing resources are configured in a cloud type configuration.

In an embodiment, a firm's data store and a firm's applications are analyzed according to known methods to identify data integration tasks, which may be cataloged in a data integration collection. For example, a Firm may employ a data integration tool 112, which may be one of a firm's applications. An exemplary data integration tool, in some embodiments, includes a data integration collection 114 stored on a memory accessible by one or more processors 118 coupled to a memory 120 storing a data integration application 112; e.g., data integration application 112 may be loaded in memory 120 by one or more processors 118 from a persistent data store. DI Application 122 may be a set of instructions configured to cause the processor to carry out various tasks in accordance with this disclosure. In some embodiments, data integration collection 114 is stored in data store 102 and retrieved by processor 118. A data integration tool has a variety of inputs and outputs 124, such as a user interface for accepting input from one or more users (man or machine) and one or more network interfaces as one would expect of a modern computer system.

In an embodiment, DI application 122 may be configured to catalog data integration tasks, e.g., data integration tasks 200, of a firm in a data integration collection 114 and then perform various techniques in accordance with this disclosure in order to optimize data integration tasks in order to ensure that they are scalable and easily manageable and are optimized for a firm's resources.

Figure 2:
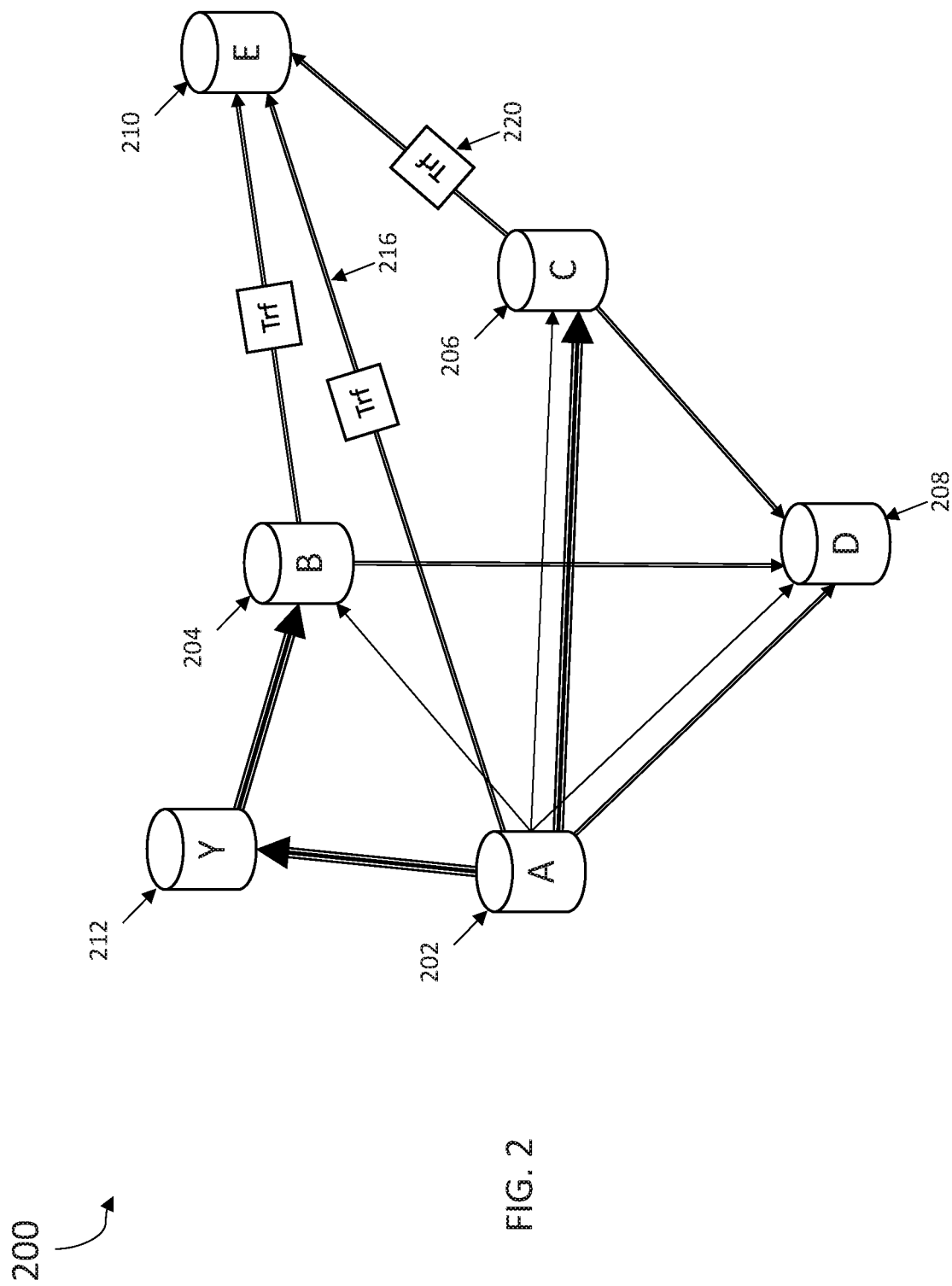
FIG. 2 is a functional diagram illustrating aspects of a point-to-point data integration in accordance with this disclosure.

FIG. 2 illustrates various exemplary un-optimized data integration tasks 200 within a firm's data store, e.g., collection 102. The various data integration tasks 200 may be relied up by one or more data users, e.g., data users 106. FIG. 2 illustrates a simple data integration hairball, in which a plurality of data stores 202, 204, 206, 208, 210, and 212, are either data sources or targets (or both) of a plurality of point-to-point data integration tasks, e.g., data integration task 216. Data integration tasks illustrated in FIG. 2 with like arrows are intended to indicate data integration tasks having a commonality, which may be a same source, a same target, or a combination of same source and same target. FIG. 2 also highlights that certain point-to-point data integration tasks may also include a data transformation, e.g., 220.

These tasks may, for example, be described in a standard language like TDL. Another way to describe a data integration collection is through relational database structures that may be queried using in any standard query language, such as SQL. In another embodiment, within a cloud based data integration collection, the collection may be accessed and queried using a API implementation, which provides a standard mechanism for describing a data store including data integration tasks. In general, upon reading this disclosure, one will appreciate that there are many ways to model a data integration collection and many ways to access and fetch information about data integration tasks from a data integration collection, and to apply changes to data integration tasks within a data integration collection.

A data integration engine may describe, and allow visualization of, data flows from sources to targets, i.e. data integration tasks. A data integration engine, e.g., DI engine 122a, may be configured to analyze the flow of data between sources and targets and create or update a data integration collection to describe a current listing of all point-to-point data integration tasks, e.g., 216, within a data store, e.g., 102.

Figure 3:
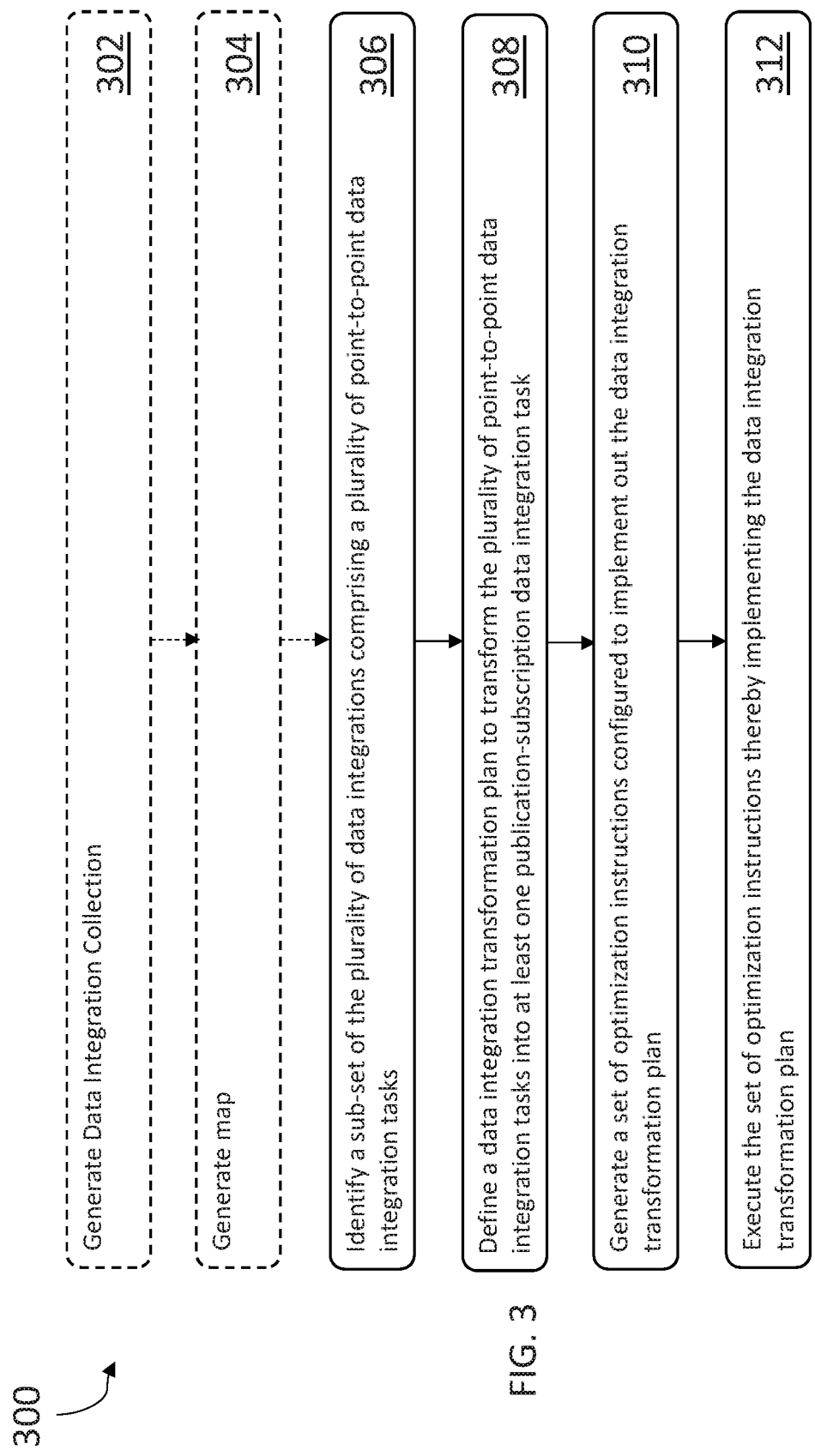
FIG. 3 is a flow chart illustrating an exemplary process in accordance with this disclosure.

FIG. 3 illustrates a flow chart diagram illustrating an exemplary process 300 for optimizing data integration tasks, e.g., data integration tasks 200 within a data store, e.g., data store 102. In a first step 302, a data integration collection may be generated; in some embodiments, a data integration collection, e.g., 114, may already have been generated and may be maintained or modified using, e.g., a data integration tool such as tool 112. In a second step 304, a data integration map may be generated; as in step 302 a data integration map may alternatively have been previously generated and may be read or modified. In step 306, an application, e.g., publication/subscription engine 122b, may evaluate the collection of point-to-point data integration tasks to identify a sub-set of all the point-to-point data integration tasks for optimization. In an embodiment, the point-to-point data integration tasks, e.g., 216, may be evaluated for optimization by identifying a commonality, such as a same source or a same target or a set of tasks associated with a same application (e.g., where different applications rely on data sets from a set of same or overlapping data sources and two or more applications request data from same sources at different or random times). In other embodiments, optimization targets may be based on design choice or based on customized requirements associated with a specific data store, e.g., data flows that rely on slow connections, or data flows that rely on slow processors, or data flows that occur on particular schedules.

In a second step 308, based on the sub-set of data integration tasks a data integration transformation plan is generated. A data integration transformation plan describes how a sub-set of point-to-point data integration tasks may be optimized by transformation to a publication/subscription, or pub/sub, model. Thus, for a data flow from a source to a target, that may include a transformation for data, a data integration transformation plan will describe at least one publisher, a publication topic, that may include a transformation of data, and at least one subscriber, as will be described in more detail below in reference to exemplary embodiments illustrated in FIGS. 5-14.

A publication topic is a data service to which one or more publishers may public data to be subscribed to by one or more subscribers. A publication topic may be a data repository, e.g. a database, configured to store all of the data that previously flowed from all the point-to-point sources to all the point-to-point targets. A publication topic may be defined to include a specification and structure of a data service and/or data store to serve as the physical location of the publication topic, and the publication topic may further be defined to include a schedule upon which data is published from the one or more sources to the publication topic. In an embodiment, a generated data integration transformation plan includes the physical location of the intended publication topic and a schedule upon which the publication is published to the physical location. In some embodiments, the plan may also include a persistence period specifying a period of time during which a particular instance of the publication is persisted after which it is deleted. In some embodiments, a persistence period may be undefined or infinite while in other embodiments, it may be persisted for a period on the order of seconds, minutes, hours, days, weeks, months, or years. In some embodiments, a resulting data integration transformation plan may optionally be provided to a user for evaluation, modification, editing, and/or approval. In some embodiments, a publication topic is one or more relational database tables. In other embodiments, a publication topic is a flat file. In some embodiments, a publisher publishes one or more data structures as one or more blobs of data in a publication topic and subscribers subscribe to such blobs of data, and are configured to interpret the blobs of data published by a publisher. In some exemplary embodiments, a publisher publishes a plurality of relational database tables to a publication topic which stores the publication as a plurality of relational database tables that are subscribed to by subscribers.

In a step 310, a set of optimization instructions may be generated for transforming the data integration relying on point-to-point data integration tasks to a pub/sub model data integration. Any such generated instructions will be specific to a data store, to the data integration tasks identified for optimization, and to the data integration engine relied upon, provided that upon reading this disclosure and fully appreciating this disclosure, generation of such instructions will be a matter of design and implementation. In a step 312, the optimization instructions may be executed by a processor to transform selected point-to-point data integration tasks to obtain optimized data integration tasks in a pub/sub configuration.

Figure 4:
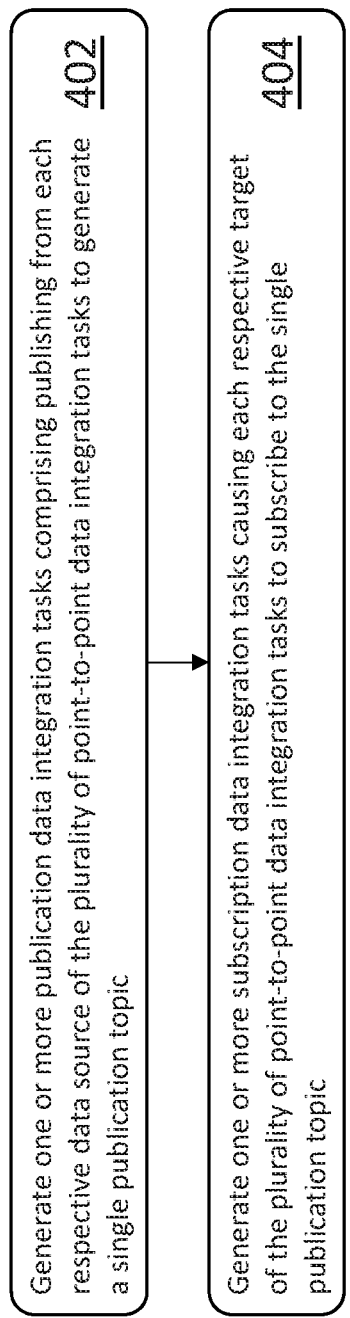
FIG. 4 is a flow chart illustrating an exemplary process in accordance with this disclosure.

FIG. 4 illustrates a flow chart diagram illustrating an exemplary process 400 for optimizing data integration tasks, e.g., data integration tasks 200 within a data store, e.g., data store 102. In a first step 402, one or more publication data integration tasks are generated, such that each of the one or more publication data integration tasks are configured to publish data from a source of a point-to-point data integration tasks to a publication topic. In one or more embodiments, a publication data integration tasks includes identifying a physical location and structure for a publication topic, a persistence schedule, and one or more data transformations that are required to create a publication topic.

In a second step 404, one or more subscription data integration tasks are generated, such that each of the one or more subscription data integration tasks are configured to subscribe to a publication topic. In one or more embodiments, these tasks may further include specification of which data fields within a publication topic a particular subscription data integration task subscribes to. A subscription data integration task may also include a schedule upon which a subscription tasks occurs. In some embodiments, rather than perform a data transformation during publication of a publication topic (e.g., as further discussed in relation to FIG. 13B), a subscription data integration task may instead include a data transformation task (e.g., as further discussed in relation to FIG. 13A). In this way, data stored in a publication topic may be untransformed and a target subscribing to particular data within a publication topic may cause a transformation during a subscription tasks.

Figure 5:
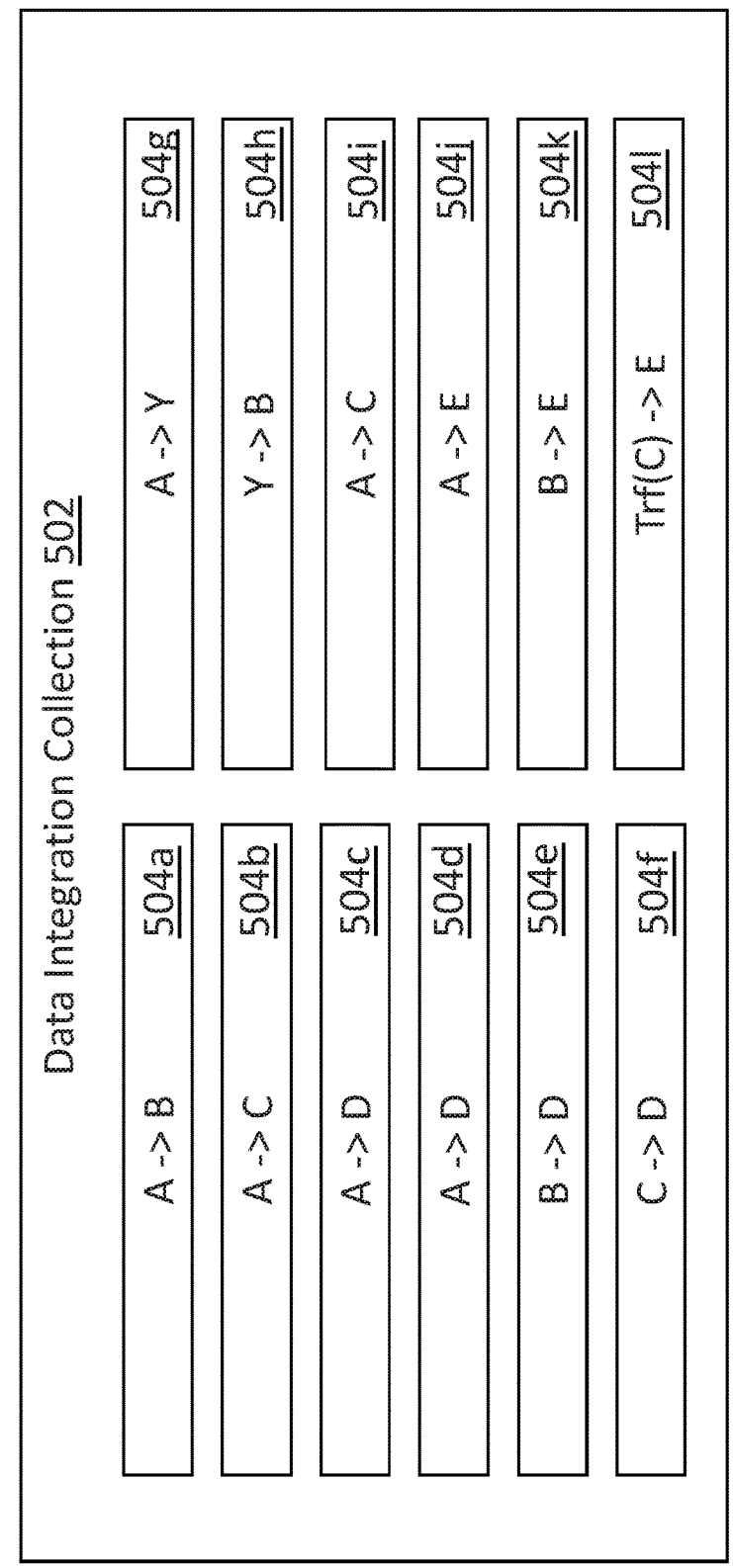
FIG. 5 illustrates aspects of a data integration collection in accordance with this disclosure.

FIG. 5 illustrates aspects of an exemplary data integration collection 502 listing a set of illustrative point-to-point data integration tasks 504 prior to optimization. For the purpose of illustrating aspects of a data integration transformation, data integration collection 502 illustrates various data integration task grouped, for ease of understanding, based on integration asks having commonalities. In a first example, data integration tasks 504a, 504b, and 504c each share a common source. In a second example, data integration tasks 504d, 504e, and 504f each share a common target. In a third example, data integration tasks 504g, 504h, and 504i each ultimately share a common source. In a fourth example, data integration tasks 504j, 504k, 504l, and 504m ultimately share a common target.

Figure 6:
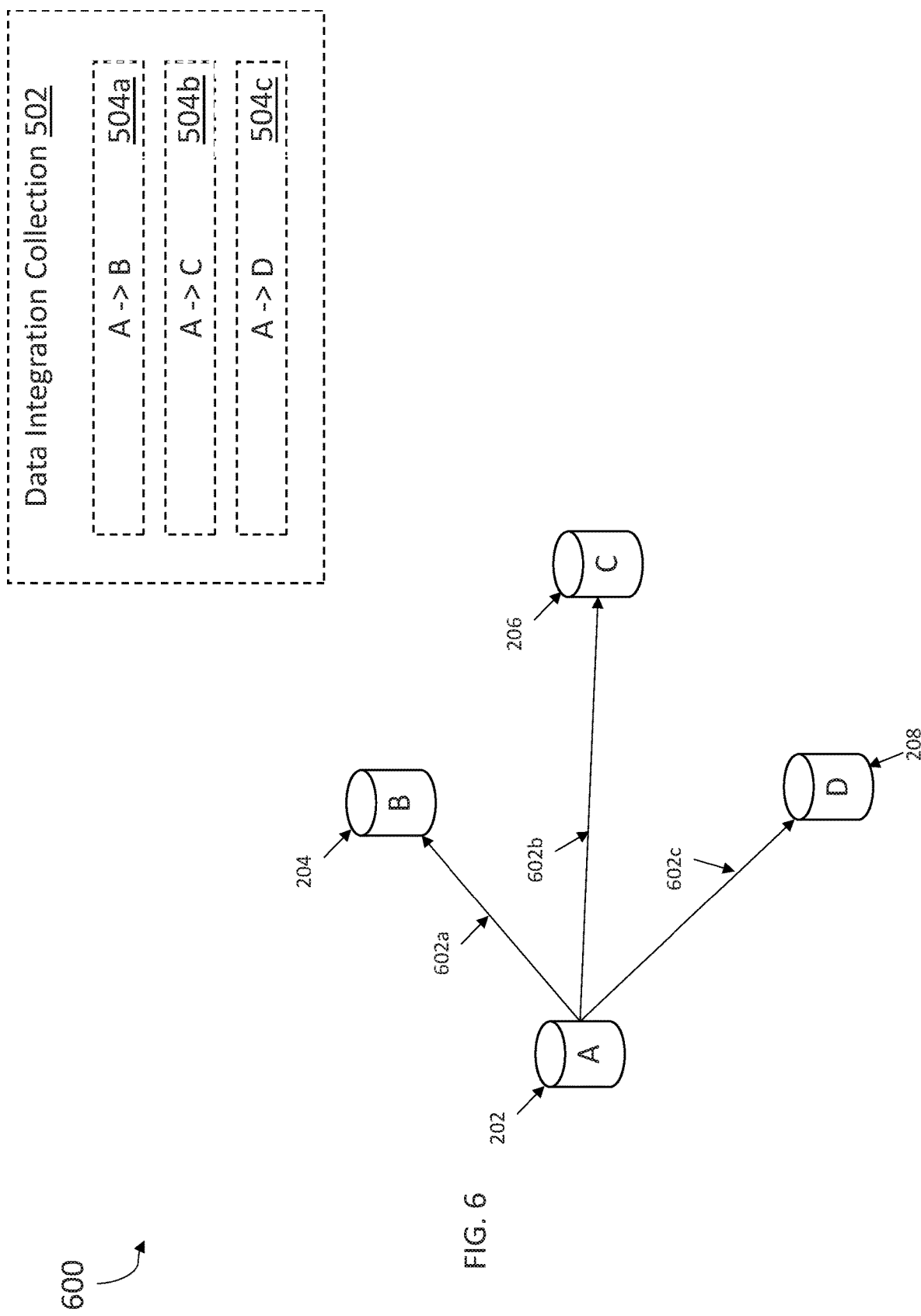
FIG. 6 is a functional diagram illustrating aspects of a point-to-point data integration in accordance with this disclosure.
Figure 7:
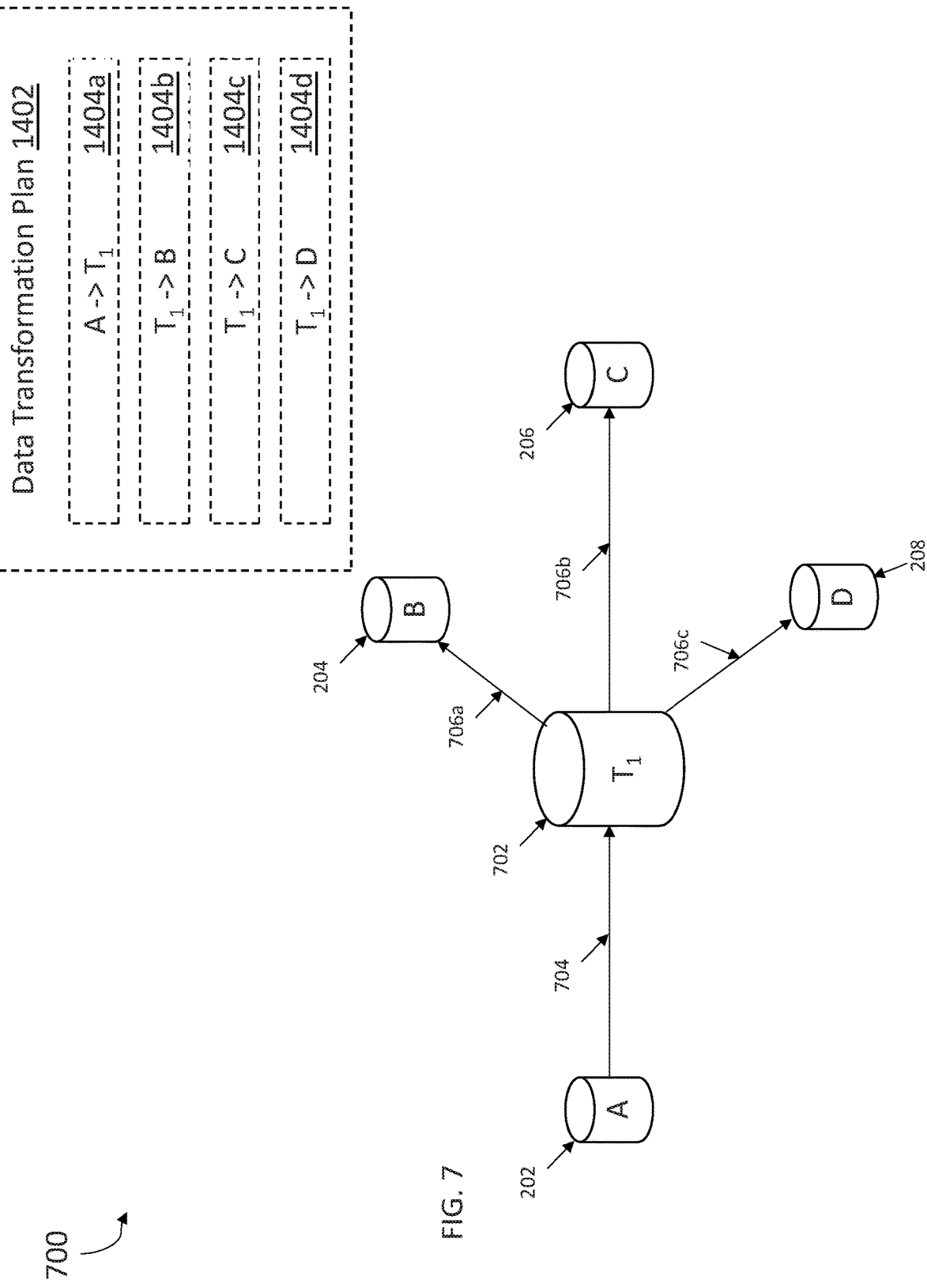
FIG. 7 is a functional diagram illustrating aspects of a pub/sub integration in accordance with this disclosure.

FIG. 6 illustrates a an exemplary set of point to point data integration tasks 600 corresponding to catalog entries 504a, 504b, 504c. Each of these integration tasks include a point-to-point data flow 602a, 602b, 602c from common data source A 202 to data targets B 204, C 206, and D 208. According to an exemplary data transformation, the point-to-point data integration tasks 600 may be optimized to a pub/sub model 700 as illustrated in FIG. 7. As illustrated in FIG. 7, in a single publication 704, data source A 202 publishes data to a single publication topic $T_1$ 702, and data targets 204, 206, 208 each subscribe to the single publication topic 702 through subscription data tasks 706a, 706b, 706c. This data publication/subscription model is further described by data integration transformation plan 1402 data integration tasks 1404a, 1404b, 1404c, 1404d. A data integration transformation plan may be generated and presented to a user, e.g., a human user in human readable form as in the following illustrative example:

For data integration tasks:
    Data Source A→Data Target B
    Data Source A→Data Target C
    Data Source A→Data Target D
    Generate data publication integration tasks:
    Data Source A→Topic Publication $T_1$
    Generate data subscription integration tasks:
    Topic Publication $T_1$→Data Target B
    Topic Publication $T_1$→Data Target C
    Topic Publication $T_1$→Data Target D Optionally, a data integration transformation plan also includes a step of deleting, removing, or disabling the un-optimized data integration tasks, e.g.:

Delete:
    Data Source A→Data Target B
    Data Source A→Data Target C
    Data Source A→Data Target D In some embodiments, such a plan is presented to a user for approval or modification prior to carrying out the data integration transformation plan to optimize a firm's data store data integration. One will appreciate that the example human readable form of a data integration plan above is intended for exemplary purposes only, and various other suitable formats and organizations of a human readable plan are possible.

Figure 9:
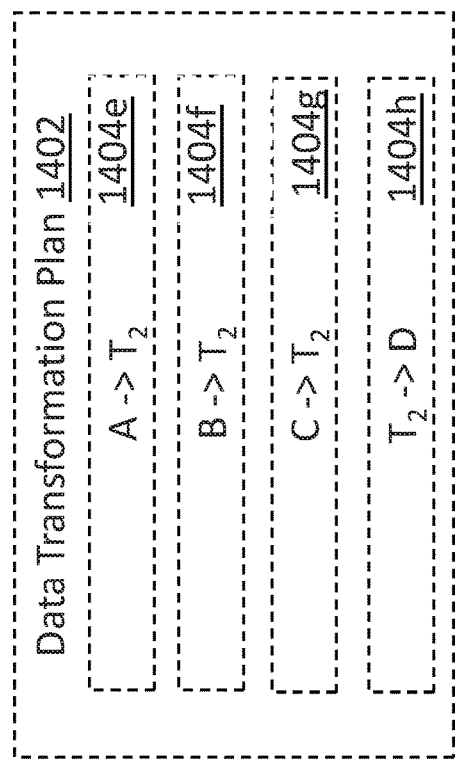
FIG. 9 is a functional diagram illustrating aspects of a pub/sub integration in accordance with this disclosure.
Figure 13B:
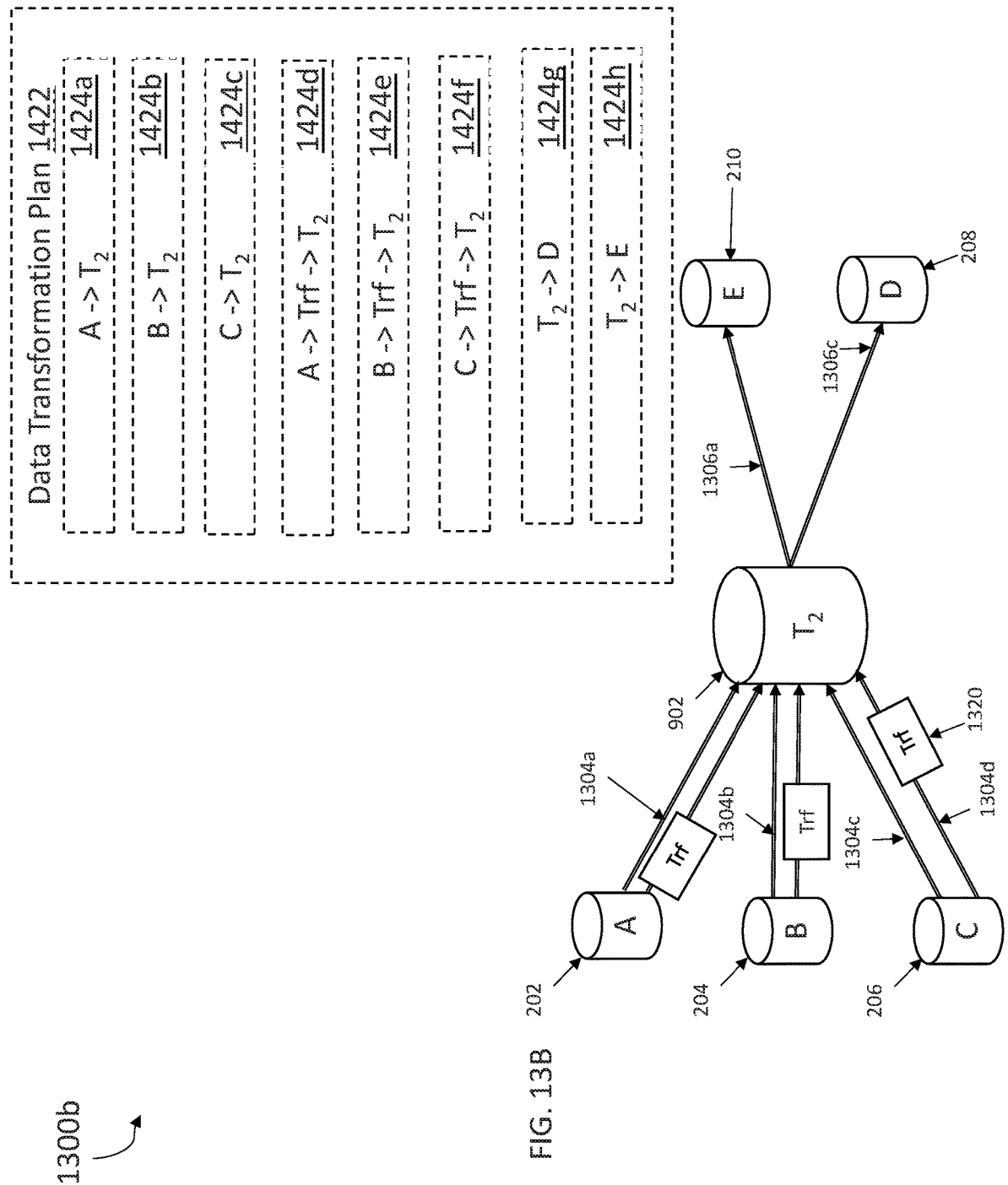

For another example, FIG. 8 illustrates a set of point to point data integration tasks 800 corresponding to catalog entries 504d, 504e, 504f. Each of these integration tasks include a point-to-point data flow 216a, 216b, 216c from data sources A 202, B 204, C 206 to data target D 208. In this example, target D 208 receives data from common sources A 202, B 204, and C 206. According to an exemplary data integration transformation, the point-to-point data integration tasks 800 may be optimized to a pub/sub model 900 as illustrated in FIG. 9. As illustrated in FIG. 9, publication data flows 216a, 216b, and 216c publish data to a single publication topic $T_2$ 902, and data target 208 subscribes to the single publication topic 902 through subscription data task 908. This data publication/subscription model is further described by data integration transformation plan 1402 data integration tasks 1404e, 1404f, 1404g, 1404h. A data integration transformation plan may be generated and presented to a user, e.g., a human user in human readable form as in the following illustrative example:

For data integration tasks:
    Data Source A→Data Target D
    Data Source B→Data Target D
    Data Source C→Data Target D
    Generate data publication integration tasks:
    Data Source A→Topic Publication $T_2$
    Data Source B→Topic Publication $T_2$
    Data Source C→Topic Publication $T_2$
    Generate data subscription integration tasks:
    Topic Publication $T_2$→Data Target D Optionally, a data integration transformation plan also includes a step of deleting, removing, or disabling the un-optimized data integration tasks, e.g.:

Delete:
    Data Source A→Data Target D
    Data Source B→Data Target D
    Data Source C→Data Target D For another example, FIG. 10 illustrates a set of point to point data integration tasks 1000 corresponding to catalog entries 504h, 504i, 504j. Each of these integration tasks include a point-to-point data flow 1002a, 1002b, 1002c from data sources A 202, and intermediate repository Y 212, to data targets B 204, and C 206. In this example, a data connection between A and B may be relatively slow, or, either data source A or data target B may be subject to heavy usage during a certain period, such that it is preferable to first flow data from A 202 to Y 212 via point-to-point data flow 1002a at a particular time to stage data at intermediate repository Y 212 until data is flowed to data target B 204. Thus, data flows 1002a-1002c are ultimately related by common sources, A 202. According to an exemplary data transformation, the point-to-point data integration tasks 1000 may be optimized to a pub/sub model 1100 as illustrated in FIG. 11. As illustrated in FIG. 11, publication data flow 1104a publishes data to a single publication topic $T_3$ 1102, and data targets 204, 206 each subscribe to the single publication topic 1102 through subscription data tasks 1106a, 1106b. This data publication/subscription model is further described by data integration transformation plan 1402 data integration tasks 1404j, 1404k, 1404l. A data integration transformation plan may be generated and presented to a user, e.g., a human user in human readable form as in the following illustrative example:

For data integration tasks:
    Data Source A→Data Target Y
    Data Source Y→Data Target B
    Data Source A→Data Target C
    Generate data publication integration tasks:
    Data Source A→Topic Publication $T_3$
    Generate data subscription integration tasks:
    Topic Publication $T_3$→Data Target B
    Topic Publication $T_3$→Data Target C Optionally, a data integration transformation plan also includes a step of deleting, removing, or disabling the un-optimized data integration tasks, e.g.:

Delete:
    Data Source A→Data Target Y
    Data Source Y→Data Target B
    Data Source A→Data Target C For another example, FIG. 12 illustrates a set of point to point data integration tasks 1200. In an embodiment, two groups of data integrations tasks respectively sharing a commonality, e.g. same respective applications, may also share a commonality, e.g., common sources. As illustrated in FIG. 12, point-to-point data integration tasks 216a, 216b, 216c share a common set of sources with point-to-point data integration tasks 216d, 216e, 216f. These point-to-point data integration tasks correspond to catalog entries 504d, 504e, 504f, 504j, 504k, 504l. Each of these integration tasks include a point-to-point data flow 216a, 216b, 216c, 216d, 216e, 216f from data sources A 202, B 204, C 206 to data targets D 208 and E 210. In this example, targets D 208 and E 210 receive data from common sources A 202, B 204, and C. Source C 206 provides data to target D 208, and provide similar data to target 210 that is first transformed by transform operation 260. In an embodiment, targets D 208 and E 210 are intended to collect a list of all customer names in sources A, B, and C. For example, First_Name and Last_Name flow from A 202, B 202, and C 206 to D 208 by point-to-point data flow 216c; and the same First_Name and Last_Name flow from A 202, B 202, and C 206 to E 210 via three separate data integration tasks 216d, 216e, 216f subject to a transformation, e.g. a concatenation of fields from A 202, B 202, and C 206 including First_Name and Last_Name such that a field Full_Name is received into E 210. Thus, data flows 216a-216f are related by common sources, A 202, B 204, and C 206, but store the customer names differently. According to an exemplary data transformation, the point-to-point data integration tasks 1200 may be optimized to a pub/sub model 1300 as illustrated in FIG. 13A. As illustrated in FIG. 13A, publication data flows 904a, 904b, and 904c publish data to a single publication topic $T_2$ 902, and data targets 208, 210 each subscribe to the single publication topic 902 through subscription data tasks 1306, 908. This data publication/subscription model is further described by data integration transformation plan 1402 data integration tasks 1404e, 1404f, 1404g, 1404h, 1404m, 1404n. As one will appreciate, when optimizing exemplary hairball integration 200, exemplary pub/sub model 1300 includes exemplary pub/sub model 900 and additional optimization such that publication topic $T_2$ contains data subscribed to by data targets D 208 and E 210. An exemplary data integration transformation plan for this example embodiment discussed above involving customer names may be generated and presented to a user, e.g., a human user in human readable form as in the following illustrative example:

For data integration tasks:
Data Source A(FN, LN)→Data Target D(FN,LN)
Data Source B(FN, LN)→Data Target D(FN, LN)
Data Source C(FN, LN)→Data Target D(FN, LN)
Data Source A(FN, LN)→Transform(FN, LN⇒FULL)→Data Target E(FULL)
Data Source B(FN, LN)→Transform(FN, LN⇒FULL)→Data Target E(FULL)
Data Source C(FN, LN)→Transform(FN, LN⇒FULL)→Data Target E(FULL)
Generate data publication integration tasks:
Data Source A(FN, LN)→Topic Publication $T_2$(FN, LN)
Data Source B(FN, LN)→Topic Publication $T_2$(FN, LN)
Data Source C(FN, LN)→Topic Publication $T_2$(FN, LN)
Generate data subscription integration tasks:
Topic Publication $T_2$(FN, LN)→Data Target D(FN, LN)
Topic Publication $T_2$(FN, LN)→Transform(FN, LN⇒FULL)→Data Target E(FULL)

Optionally, a data integration transformation plan also includes a step of deleting, removing, or disabling the un-optimized data integration tasks, e.g.:
Delete:
Data Source A(FN, LN)→Data Target D(FN,LN)
Data Source B(FN, LN)→Data Target D(FN, LN)
Data Source C(FN, LN)→Data Target D(FN, LN)
Data Source A(FN LN)→Transform(FN, LN⇒FULL)→Data Target E(FULL)
Data Source B(FN, LN)→Transform(FN, LN⇒FULL)→Data Target E(FULL)
Data Source C(FN, LN)→Transform(FN, LN⇒FULL)→Data Target E(FULL)

According to an alternative data transformation plan 1422, data integrations 1200 are transformed to a data publication data subscription model 1300b, which includes performing transformation 1320 during publications rather than during a subscription task, e.g., 1306. If, for example, data target E 210 is a slow resource such that it is desirable to shift resources for performing data processing off of a data service providing target E 210, it may be desirable to publish both transformed and untransformed data from A 202, B 204, C 206 to publication topic $T_2$ 902. This may result in an alternative data transformation plan 1422 including data publication tasks 1424a-1424f and data subscription tasks 1424g and 1424h. An exemplary data integration transformation plan for this example embodiment may be generated and presented to a user, e.g., a human user in human readable form as in the following illustrative example:

For data integration tasks:
Data Source A(FN, LN)→Data Target D(FN,LN)
Data Source B(FN, LN)→Data Target D(FN, LN)
Data Source C(FN, LN)→Data Target D(FN, LN)
Data Source A(FN, LN)→Transform(FN, LN⇒FULL)→Data Target E(FULL)
Data Source B(FN, LN)→Transform(FN, LN⇒FULL)→Data Target E(FULL)
Data Source C(FN, LN)→Transform(FN, LN⇒FULL)→Data Target E(FULL)
Generate data publication integration tasks:
Data Source A(FN, LN)→Topic Publication T2(FN, LN)
Data Source B(FN, LN)→Topic Publication T2(FN, LN)
Data Source C(FN, LN)→Topic Publication T2(FN,LN)
Data Source A(FN, LN)→Transform(FN, LN⇒FULL)→Topic Publication T2(FULL)
Data Source B(FN, LA)→Transform(FN, LN⇒FULL)→Topic Publication T2(FULL)
Data Source C(FN, LN)→Transform(FN, LN⇒FULL)→Topic Publication T2(FULL)
Generate data subscription integration tasks:
Topic Publication $T_2$(FN, LN)→Data Target D(FN, LN)
Topic Publication $T_2$(FULL)→Data Target E(FULL)

Optionally, a data integration transformation plan also includes a step of deleting, removing, or disabling the un-optimized data integration tasks, e.g.:
Delete:
Data Source A(FN, LN)→Data Target D(FN,LN)
Data Source B(FN, LN)→Data Target D(FN, LN)
Data Source C(FN, LN)→Data Target D(FN, LN)
Data Source A(FN, LN)→Transform(FN, LN⇒FULL)→Data Target E(FULL)
Data Source B(FN, LN)→Transform(FN, LN⇒FULL)→Data Target E(FULL)
Data Source C(FN, LN)→Transform(FN, LN⇒FULL)→Data Target E(FULL)

Additionally, different data sources may store similar data in different formats. A variety of algorithms may ultimately be used to identify source groups and target groups having a commonality. For example, cluster analysis techniques such as K-means clustering may be employed, whereas Jaro-Winkler distances may be employed for identifying common string based data. In an embodiment, various hierarchical database may be analyzed for commonalities by first projecting hierarchical semi-structured sources into relational representations, which then can be treated like other relational tables.

FIG. 14 illustrates a data integration transformation plan 1402 for optimizing the data integration described in data integration collection 502. In an embodiment, a data integration transformation plan may also include details (not particular depicted) regarding data integration tasks to be removed, disabled, or deleted. And in some embodiments, a data integration collection may be updated to reflect an optimized data integration as a result of a data integration transformation plan such as plan 1402.

Figure 15:
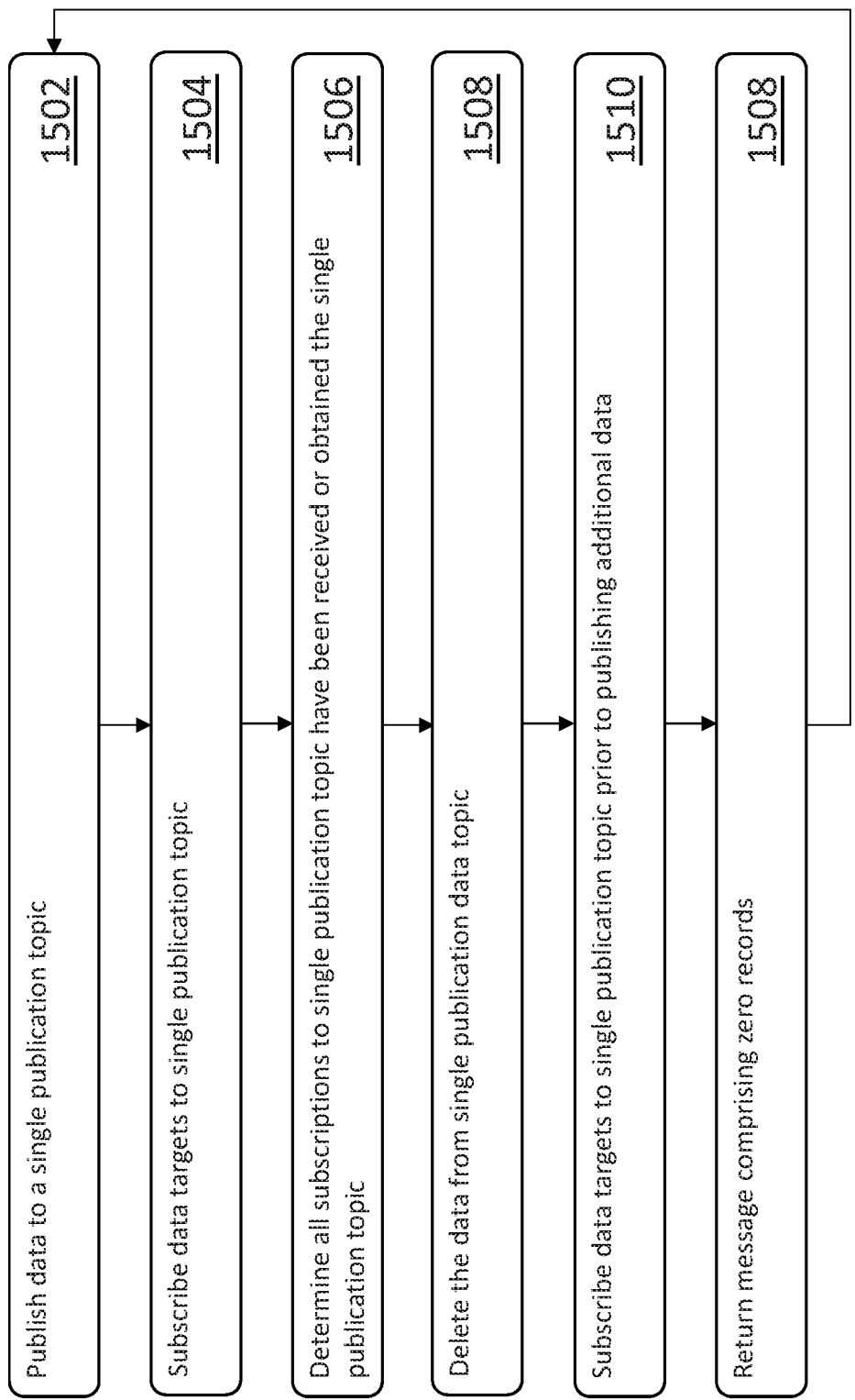
FIG. 15 is a flow chart illustrating an exemplary process in accordance with this disclosure.

FIG. 15 illustrates a process 1500 that is interrelated with embodiments illustrated in FIGS. 1-14. In a first step 1502, data is published to a publication topic, e.g. 702, 902, 1102 in exemplary embodiments above. In step 1502, data published to a publication topic may be published from one or more sources. In a second step 1504, a publication topic is subscribed to. In step 1504, one or more data targets may subscribe to a publication topic thereby obtaining or retrieving or receiving data from a publication topic. In a third step 1506, it is determined that all subscribers to a publication topic have subscribed to, e.g., obtained or received, respective data from a publication topic, and at step 1508 all subscriptions having been fulfilled a publication topic is deleted. When an event causing a publication reoccurs at step 1510, steps 1502, 1504, 1506, and 1508 are repeated. In an interrelated embodiment, data publication in step 15202 may occur according to a schedule, such that data is published periodically according to a schedule. In an interrelated embodiment, an event may be a trigger, which may be an amount of new data in a data source, or which may be an external event, or a scheduler. In an interrelated embodiment, data subscribers to a publication topic may occur according to a schedule, such that data is obtained, or received, or retrieved according to a schedule at a scheduled period of time. In an embodiment, where a publication occurs according to a schedule, subscriptions may be scheduled to occur after a publication is scheduled to occur. In an embodiment, step 1508 is an optional step, as a system architect may decide to retain data within a publication topic for a predetermined amount of time (or indefinitely) after subscribers have obtained published data.

Figure 16:
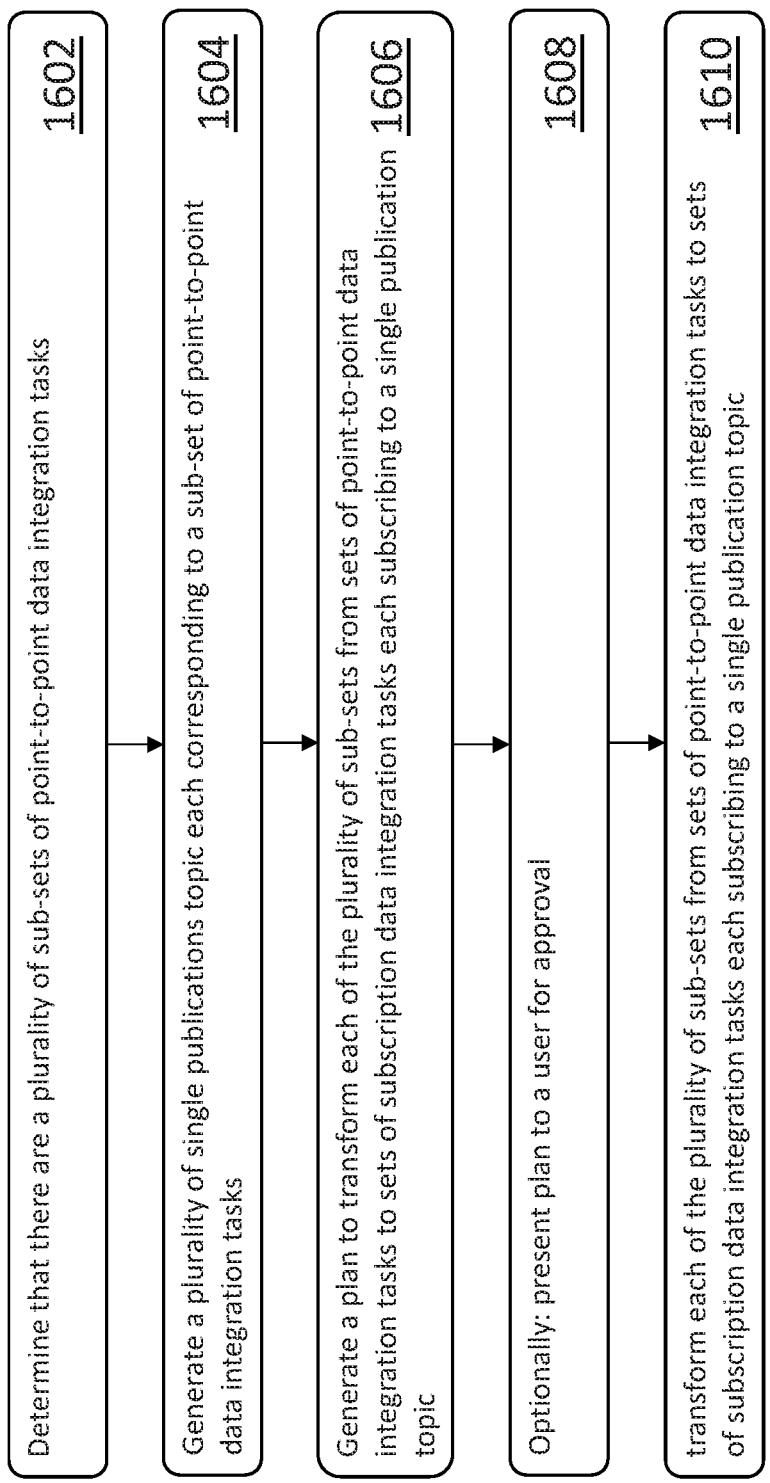
FIG. 16 is a flow chart illustrating an exemplary process in accordance with this disclosure.

FIG. 16 illustrates an process 1600 that is interrelated with exemplary embodiments illustrated in FIGS. 1-15. In a first step 1602, it is determined that a plurality of sub-sets of point-to-point integration tasks are selected, e.g., to be optimized in accordance with this disclosure. In an embodiment, a determination in step 1602 is based on an analysis of a data integration collection in accordance with this disclosure. At step 1604, a plurality of single publication topics are generated, each respectively corresponding to one of a plurality of sub-sets of point-to-point integration tasks. In some embodiments, respective sub-sets are selected based on a determination that each data integration task member of a respective subset shares one or more respective commonalities. A plan is generated at step 1606 to transform each of a plurality of sub-sets of point-to-point data integration tasks to sets of subscription data integration tasks, each including subscribing to a single publication topic. In an optional step 1608, a data integration transformation plan is presented to a user for modification and/or approval. In step 1610, each of the plurality of subsets of point-to-point data integration tasks is transformed into a set of subscription data integration tasks such that each respective data target subscribes to at least one single publication topic.

Figure 17:
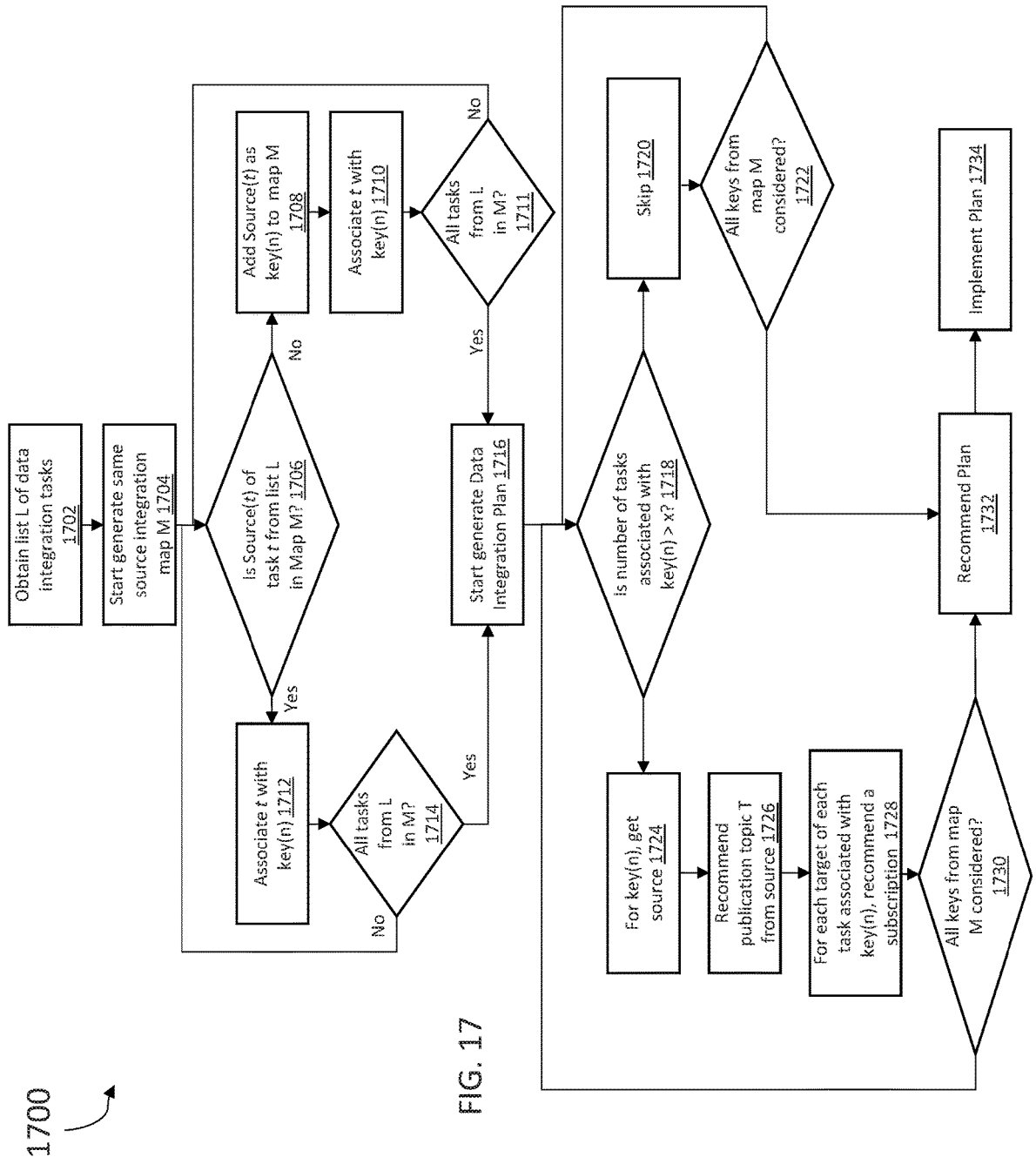
FIG. 17 is a flow chart illustrating an exemplary process in accordance with this disclosure.
Figures 18, 19, 20:
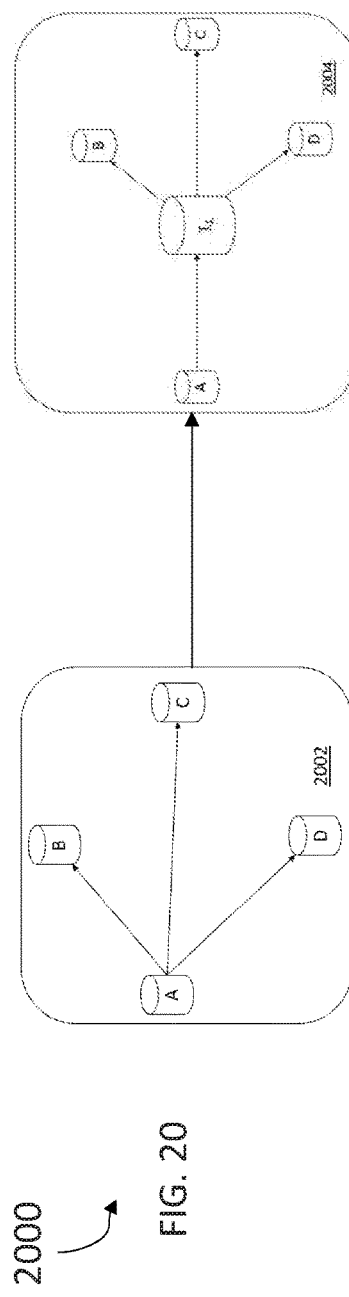
FIG. 18 is an illustration of an exemplary empty integration map in accordance with this disclosure.
FIG. 19 is an illustration of an exemplary populated integration map according with this disclosure.
FIG. 20 is an illustration of a data integration optimization in accordance with this disclosure.

FIG. 17 is a flow chart 1700 illustration of a process in accordance with this disclosure. In a first operation 1702, a list L of data integration tasks is obtained (or received, or retrieved). In embodiments, a list L of data integration tasks may be retrieved from a data integration collection, e.g., 114. List L may, e.g., be a linked list containing a list of data integration tasks. In some embodiments, a data integration collection is first created by querying a data store, e.g., 102, via an API such as REST API or JDBC. In other embodiments, a data integration collection already exists. Having obtained list L of data integration tasks, in some embodiments, a same source strategy is implemented. In operation 1704, a same source integration map M is generated. For example, FIG. 18 illustrates an exemplary data integration map M 1800, which may be employed in a same source optimization strategy. Exemplary map M 1800 contains a list of keys 1810 associated with a list of integration tasks. In embodiments map 1800 is initialized as an empty key-value map. In operation 1706, a first data integration task t is evaluated, and the source of data integration task t, source(t), is checked against keys, e.g., 1810 of map M 1800. If no key in map M corresponds to source(t), in operation 1708 source(t) is added as a key to map M. In some embodiments, a key is formed from source(t), e.g., by applying a suitable hash algorithm to source(t) to generate a key value to add to the list of keys, e.g., 1810, in a map M 1800. One suitable key may be generated as follows:

Hash(Source)=concat(source.connection.id, source.object.name)

One will appreciate upon reading this disclosure that many suitable hash functions may be employed as a matter of design considerations.

In operation 1710, data integration task t is added to map M as a value associated with a key corresponding to source (t). In operation 1711, if all tasks from list L have been added to map M, the process proceeds to operation 1716; if not all tasks are in map M, the process returns to operation 1706, and another task is evaluated to determine if source(t) is in map M. If yes, in operation 1712, task t is added to map M as a value associated with a key corresponding to source(t). When all tasks have been determined to have been added to map M in operation 1714, the process proceeds to operation 1716, and generating a data integration plan is performed.

In operation 1719, for a key in map M, a count of associated tasks is determined, and measured against a threshold x. In some embodiments, x=1, a trivial case. In other embodiments, x may be greater than 1 as determined by a system designer. If a number of tasks associated with a key is not greater than x, in operation 1720, the key is skipped. If all keys from map M have been considered, in operation 1722, the process flows to step 1732, if not the process returns to operation 1718, and another key from map M is evaluated. If a number of tasks associated with a key in map M is greater than threshold x, a corresponding source is obtained from key in operation 1724. In operation 1726, a publication topic T is recommended based on source structure, and in operation 1728 each target of each task value associated with the current key from map M is identified and a subscription task subscribing to publication topic T is recommend. If not all keys in map M have been considered, the process returns to operation 1718. If all keys have been considered, in operation 1732 a data integration transformation plan is recommended based on the publication topic T and subscription tasks recommended in operations 1726, 1728. If approved, in operation 1734, the data transformation plan is implemented.

FIG. 19 illustrates an exemplary data integration map 1900 comprising keys 1910 including HASH(A) and HASH (E). Key HASH(A) is associated with three tasks TASK (A→B), TASK(A→C), TASK(A→D), and HASH(E) is associated with one task TASK(E→F). In this example, during operation 1718, if x=1, HASH(E) is a key that would be skipped, but HASH(A) would result in a publication/ subscription strategy resulting, in step 1734, with transformation 2000 in FIG. 20, where point to point data integration tasks 2002 are transformed to a publication subscription model data integration 2004. In embodiments, values, e.g., 1820, 1920, may be added as JAVA objects describing data integration tasks.

In one exemplary embodiment, instructions of a data integration tool, e.g., tool 112, may include the following exemplary instructions for adding tasks to a integration map, e.g., 1900, e.g., during operations 1708, 1710:

```
Map<String, List<Task>> srcObjects = new HashMap<>( );
for (Task task : tasks) {
    srcObjects.computeIfAbsent(task.hash( ), k -> new
        ArrayList<>( )).add(task);
}
```

It is possible that data integration tasks may be duplicative, e.g., where a task may be copied for backup or versioning purposes, in which cases, it may be desirable to optionally filter duplicative tasks following operation 1702.

In one exemplary embodiment, during operation 1734, a publication topic may be generated in accordance with the following exemplary instructions, which may be instructions of a data integration tool, e.g., tool 112:
URL:/dih-console/uiapi/v1/topics create
Request Payload:
{"categories":[ ], "dataWriteAllowed":true, "defaultStorageLocation":true, "deprecated":false, "description":" ", "discardDelayedEvents":false, "eventAggregatedStatus": {"hasDelayedEvents":false, "HasNonFinalEvents":false, "hasNonFinalNonDelayedEvents":false, "externalId":" ", "lastModifiedDate":"2019-12-02T16:17:48.127Z", "partitioned":false, "publicationRepositoryType": "RDBMS", "publisherCount":0, "retentionPeriod":7, "status": "VALID", "storageLocation":"USERS", "subscriberCount":0, "topicId":-1, "topicName":"test123", "topicReadOnly":false, "topicType": "Delta", "unstructured": false, "writePermitied":false, "canonicalStructure": {"schemas":[{"name": "tables":[{"tableName":"table1", "columns":[{"columnName":"field1", "typeName": "STRING", "primaryKey":false, "nullable":true, "scale":-1, "length":255, "filterAccelerator":false, "isEncrypled":false, "systemDefinedAccelerator":false}, {"columnName":"field2", "typeName":"STRING", "primaryKey":false, "nullable":true, "scale":-1, "length":255, "filterAccelerator":false, "isEncrypted":false, "systemDefinedAccelerator":false},{"columnName":"DIH_PUBLICATION_INSTANCE_DATE", "typeName":"PUBLICATION_DATE_ FIELD_TYPE", "primary Key":false, "nullable":false, "scale":-1,"length":-1, "filterAccelerator":true,"isEncrypted": false, "systemDefinedAccelerator":true}, {"columnName":"DIH_PUBLICATION_INSTANCE_ID", "typeName":"PUBLICATION_INSTANCE_ID_FIELD_ TYPE", "primaryKey":false, "nullable": false, "scale":0, "length":19, "filterAccelerator":true, "isEncrypted":false, "systemDefined Accelerator": false}]}]}], "customMetadata":{ }}}

In one exemplary embodiment, during operation 1734, one or more topic subscriptions may be generated in accordance with the following exemplary instructions, which may be instructions of a data integration tool, e.g., tool 112:
URL:/dih-console/uiapi/v1/subscriptions
Request Payload:
{"allowDiscardEvents":true, "applicationId":3956, "applicationName":"employee", "customWorkflowName":" ", "dataWriteAllowed":true, "deliveryPreferencesType":"ALL_AVAILABLE_DATA", "description":"enableStatus": "ENABLE", "endpointType":"UNKNOWN", "eventAggregatedStatus": {"hasDelayedEvents":false, "hasNonFinalEvents":false, "hasNonFinalNonDelayedEvents":false}, "externalId":" ", "icsTask":{"id": "010UQX0I000000000003", "orgId":"010 UQX", "name": "empSub", "description":" ", "updateTime":" ", "createdBy":"cihilabs", "updatedBy": "cihilabs", "taskType":"DSS", "taskTypeDescription":"Data Synchronization"}, "icsTaskName":"empSub", "insertStrategy":"APPEND","isPushDown":false, "isSorted":false, "isOnlineSubscription":false, "mappingType": "CUSTOM_WORKFLOW", "numberOfPartitions":1, "pubArrivalTimeFrameInHours":1, "schedule":{"cronExpression":"0 45 17**?", "cronExpressionDetails":{"daily_ hours":"0", "daily_minutes":"0", "hourly_interval":"1", "minutely_interval":"1", "monthly_at_day":"1", "monthly_ expression_placing":"FIRST", "monthly_expression_weekday":"DAY", "monthly_hours":"0", "monthly_minutes": "0", "monthly_recurrence":"EXPRESSION", "recurrence": "MINUTELY", "secondly_minutes":"5", "secondly_seconds":"0", "used":true, "weekly_friday":false, "weekly_ hours":"0", "weekly_minutes":"0", "weekly_monday":true, "weekly_saturday":false, "weekly_sunday":false, "weekly_thursday":false, "weekly_tuesday":false, "weekly_ wednesday":false}, "description": null, "scheduleId":null, "scheduleName":null, "status":"ENABLED"}, "status": "INVALID", "subscriptionName": "sub123", "topics": [{"topicId":3337, "topicName":"employee", "description":" ", "dataWriteAllowed":false, "topicReadOnly":true, "writePermitted":false, "topicType":"Delta", "publicationRepositoryType":"RDBMS", "status":"VALID", "externalId":"DIH_top_employee", "canonicalStructure":{"endpointType":"RDBMS", "schemas":[{"name":"employee", "empty":false, "tables":[{"tableName":"emp", "columns": [{"isEncrypted":false, "dihInternalField":false, "binaryType":false, "name":"id", "columnName":"id", "typeName":"INT64", "primaryKey":false, "nullable":true, "scale":-1,"length":-1, "filterAccelerator":true, "systemDefinedAccelerator":false}, {"isEncrypted":false, "dihInternalField":false, "binaryType":false, "name":"name", "columnName":"name", "typeName":"STRING", "primaryKey":false, "nullable":true, "scale":-1, "length":255, "filterAccelerator": false, "systemDefinedAccelerator":false}, {"isEncrypted":false, "dihInternalField":false, "binary Type":false, "name":"age", "columnName":"age", "typeName":"DECIMAL", "primaryKey":false, "nullable":true, "scale":0, "length":3, "filterAccelerator":false, "systemDefinedAccelerator":false}, {"isEncrypted":false, "dihInternalField":false, "binaryType":false, "name":"city", "columnName": "city", "typeName":"SIRING", "primaryKey": false, "nullable":true, "scale":-1, "length":50, "filterAccelerator":true, "systemDefinedAccelerator": false},{"isEncrypted":false, "dihInternalField":false, "binaryType":false, "name":"salary", "columnName":"salary", "type Name":"DECIMAL", "primaryKey":false, "nullable":true, "scale":2, "length":15,"filterAccelerator":false, "systemDefinedAccelerator":false}, {"isEncrypted":false, "dihInternalField":true, "binaryType":false, "name":"DIH_ PUBLICATION_INSTANCE_DATE", "columnName":"DIH_PUBLICATION_INSTANCE_DATE", "typeName": "PUBLICATION_DATE_FIELD_TYPE", "primaryKey": false, "nullable":false, "scale":-1, "length":-1, "filterAccelerator":true, "systemDefinedAccelerator":true}, {"isEncrypted":false, "dihInternalField":true, "binaryType":false, "name":"DIH_PUBLICATION_INSTANCE_ID", "columnName":"DIH_PUBLICATION_INSTANCE_ID", "typeName":"PUBLICATION_INSTANCE_ID_FIELD_ TYPE", "primaryKey":false, "nullable": false, "scale":0, "length":19, "filterAccelerator":true, "systemDefinedAccelerator":false}], "name":"emp", "customMetadata":{"CANONIC_TABLE_STAGING_ NAME": "emp_employee", "CANONIC_TABLE_UTILITY_NAME":"emp_employee_DIHUTILITY"}}]}], "singleSchema":{"name":"employee", "empty":false, "tables":[{"tableName": "emp", "columns":[{"isEncrypted":false, "dihInternalField":false, "binaryType":false, "name":"id", "columnName":"id", "typeName":"INT64", "primaryKey":false, "nullable":true, "scale":-1, "length":-1, "filterAccelerator":true, "systemDefinedAccelerator":false}, {"isEncrypted":false, "dihInternalField": false, "binaryType":false, "name":"name", "columnName": "name", "typeName":"STRING", "primaryKey":false, "nullable":true, "scale":-1, "length":255, "filterAccelerator":false, "systemDefinedAccelerator":false}, {"isEncrypted": false, "dihInternalField":false, "binaryType": false, "name":"age", "columnName":"age", "type Name": "DECIMAL", "primaryKey":false, "nullable":true, "scale": 0, "length":3, "filterAccelerator":false, "systemDefinedAccelerator":false}, {"isEncrypted":false, "dihInternalField":false, "binaryType":false, "name":"city", "columnName":"city", "typeName":"STRING", "primaryKey":false, "nullable":true, "scale":-1, "length":50, "filterAccelerator":true, "systemDefinedAccelerator":false), {"isEncrypted":false, "dihInternalField":false, "binaryType":false, "name":"salary", "columnName":"salary", "typeName":"DECIMAL", "primaryKey":false, "nullable": true, "scale":2, "length":15, "filterAccelerator":false, ",systemDefinedAccelerator":false}, {"isEncrypted":false, "dihInternalField":true, "binaryType":false, "name":"DIH_PUBLICATION_INSTANCE_DATE", "columnName":"DIH_PUBLICATION_INSTANCE_DATE", "typeName": "PUBLICATION_DATE_FIELD_TYPE", "primaryKey": false, "multable":false, "scale":-1, "length":-1, "filterAccelerator":true, "systemDefinedAccelerator":true), {"isEncrypted":false, "dihInternalField":true, "binaryType":false, "name":"DIH_PUBLICATION_INSTANCE_ID", "columnName":"DIH_PUBLICATION_INSTANCE_ID", "typeName": "PUBLICATION_INSTANCE_ID_FIELD_TYPE", "primaryKey":false, "nullable": false, "scale":0, "length":19, "filterAccelerator":true, "systemDefinedAccelerator":false}], "name":"emp", "customMetadata":{"CANONIC_TABLE_STAGING_NAME":"emp_employee", "CANONIC_TABLE_UTILITY_NAME": "emp_employee_DIHUTILITY"}}]}, "customMetadata":{ }}, "unstructured":false, "retentionPeriod": 7, "storageLocation":"PRIMARY", "categories":[ ], "event AggregatedStatus":{"hasNonFinalNonDelayedEvents": false, "hasDelayedEvents":false, "discardDelayedEvents": false, "lastModifiedDafe":1571630421430, "lastStruciuralChangeDate":157 1149485807, "defaultStorageLocation": true, "deprecated":false, "subscriberCount":3, "publisherCount":1, "partitioned":false}], "triggerOption": "WHEN_PUBLISHED", "unboundSubscription":false, "unstructured":false, "writePermitted":true, "batchSize": "1000", "apiNotificationUrl":" "}

Figure 21:
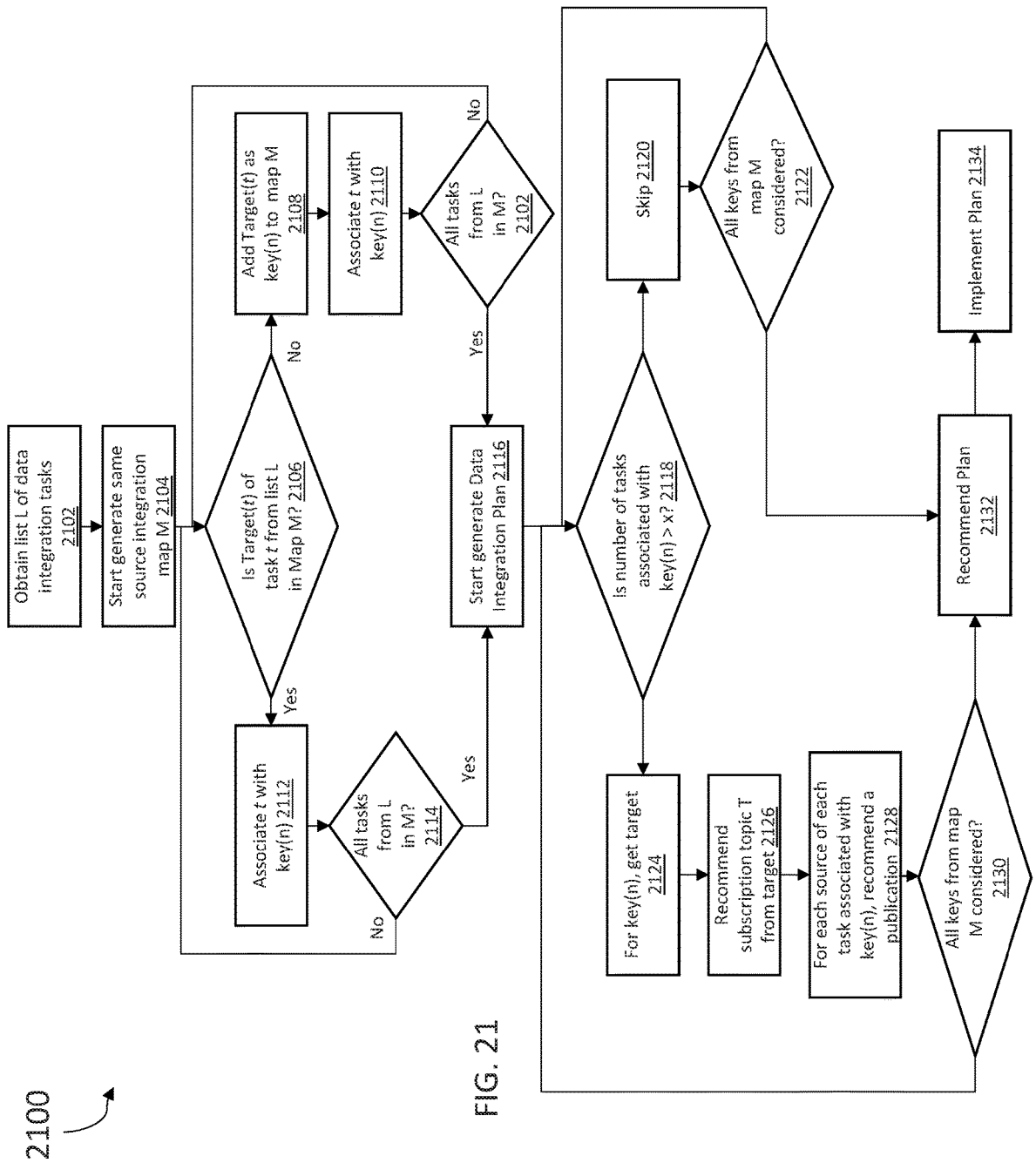
FIG. 21 is a flow chart illustrating an exemplary process in accordance with this disclosure.

FIG. 21 is a flow chart 2100 illustration of a process employing a same target strategy in accordance with this disclosure. In a first operation 2102, a list L of data integration tasks is obtained (or received, or retrieved). In embodiments, a list L of data integration tasks may be retrieved from a data integration collection, e.g., 114. List L may, e.g., be a linked list containing a list of data integration tasks. In some embodiments, a data integration collection is first created by querying a data store, e.g., 102, via an API such as REST API or JDBC. In other embodiments, a data integration collection already exists. Having obtained list L of data integration tasks, in some embodiments, a same source strategy is implemented. In operation 2104, a same target integration map M is generated. For example, FIG. 22 illustrates an exemplary data integration map M 2200, which may be employed in a same target optimization strategy. Exemplary map M 2200 contains a list of keys 2210 associated with a list of sets of integration tasks. In embodiments map 2200 is initialized as an empty key-value map. In operation 2106, a first data integration task t is evaluated, and the target of data integration task t, target(t), is checked against keys, e.g., 2210 of map M 2200. If no key in map M corresponds to target(t), in operation 2208 target(t) is added as a key 2210 to map M. In some embodiments, a key is formed from target (t), e.g., by applying a suitable hash algorithm to target(t) to generate a key value to add to the list of keys, e.g., 2210, in a map M 2200. One suitable key may be generated as follows:

Hash(Target)=concat(Target.connection.id, Target.object. name)

One will appreciate upon reading this disclosure that many suitable hash functions may be employed as a matter of design considerations.

In operation 2110, data integration task t is added to map M as a value associated with a key corresponding to target (t). In operation 2111, if all tasks from list L have been added to map M, the process proceeds to operation 2116; if not all tasks are in map M, the process returns to operation 2106, and another task is evaluated to determine if target(t) is in map M. If yes, in operation 2112, task t is added to map M as a value associated with a key corresponding to target(t). When all tasks have been determined to have been added to map M in operation 2114, the process proceeds to operation 2116, and generating a data integration plan is performed.

In operation 2119, for a key in map M, a count of associated tasks is determined, and measured against a threshold x. In some embodiments, x=1, a trivial case. In other embodiments, x may be greater than 1 as determined by a system designer. If a number of tasks associated with a key is not greater than x, in operation 2120, the key is skipped. If all keys from map M have been considered, in operation 2122, the process flows to step 2132, if not the process returns to operation 2118, and another key from map M is evaluated. If a number of tasks associated with a key in map M is greater than threshold x, a corresponding source is obtained from key in operation 2124. In operation 2126, a publication topic T is recommended based on target structure and a subscription task recommending target(t) subscribe to topic T, and in operation 2128 each source of each task value associated with the current key from map M is identified and a publication task publishing to publication topic T is recommend. If not all keys in map M have been considered, the process returns to operation 2118. If all keys have been considered, in operation 2132 a data integration transformation plan is recommended based on the publication topics T and subscription tasks recommended in operations 2126, 2128. If approved, in operation 2134, the data transformation plan is implemented.

FIG. 22 illustrates an exemplary data integration map 2200 comprising keys 2210 including HASH(D) and HASH (F). Key HASH(D) is associated with three tasks TASK (A→D), TASK(B→D), TASK(C→D), and HASH(F) is associated with one task TASK(G F). In this example, during operation 2118, if x=1, HASH(F) is a key that would be skipped, but HASH(A) would result in a publication/subscription strategy resulting, in step 2134, with transformation 2300 shown in FIG. 23, where point to point data integration tasks 2302 are transformed to a publication subscription model data integration 2304. In embodiments, values, e.g., 2220 may be added as JAVA objects describing data integration tasks.

In one exemplary embodiment, during operation 2134, a publication topic based on a same target strategy may be generated in accordance with the following exemplary instructions, which may be instructions of a data integration tool, e.g., tool 112:

URI:/saas/api/v2/dssfask

Request Payload: {"@type":"dssTask", "orgId": "010UQX", "name":"empDSSPub", "description":" ", "createTime":"2019-09-2IT12:03:17.000Z", "updateTime": "2019-11-22T06:43:33.000Z", "createdBy": "cihilabs", "updatedBy":"cihilabs", "maxLogs":10, "sourceConnectionId":"010UQX0B000000000 003", "targetConnectionId":"010UQX0B000000000002", "targetObject":"employee/emp", "target ObjectLabel":"employee/emp", "operation":"Insert", "maxRows":0, "truncate Target":false, "bulkApiDBTarget":false, "verbose":false, "targetXfetadataUpdated":false, "modelVersion":"V3-R600", "queryAll":false, "srcSettings":{"@type":"taskDataSourceSetting", "isShowLabels":false,"isNaturalOrder":true}, "tgtSettings":{"@type":"taskDataSourceSetting", "isShowLabels":true, "is NaturalOrder":true}, "cfSettings":{"@type":"taskDataSourceSetting", "isShowLabels":false, "isNaturalOrder":false}, "bulkApi":false, "bulkApiSerialMode":false, "bulkApiMonitor":false, "isTargetObjectSfCustom":false, "allowNullUpdates":false, "targetBatchSize":200, "assignmentRuleId":"−1", "assignmentRuleType":"None", "createSuccessFile":false, "bulkApiHardDelete":false, "srcRun timeAttrs":{"@type": "taskRuntimeAttrs", "attrs":{ }}, "tgtRuntimeAttrs": {"@type":"taskRuntimeAttrs", "attrs":{"CloudIntegration Hub Publication name":"empPub", "Success File Directory":" ", "Error File Directory":" ", "CloudIntegration Hub Commit interval":"200" }}, "sourceObjects":[{"@type": "mObject","name":"EMP","label":"EMP","metadataUpdated":false,"relations":[ ],"children":[ ]}], "advancedFilters":[ ], "filters":[ ], "fieldMaps":[{"@type":"fieldMap", "targetField":{"@type":"field", "name":"id", "type": "string", "uniqueName":"id", "label":"id","parentObject": "employee/emp", "pcType":"NSTRING", "precision":20, "scale":0, "columnIndex":−1, "isKey":false, "isExternalId": false, "isSfldLookup":false, "isNullable":true, "isUnique": false, "isCreateable":false, "isUpdateable":true, "isFilterable":true, "isCalculated":false, "javaType": "java.lang.String", "showLabel":true, "naturalOrder":0, "linkedFields":["EMPNO"], "relatedInfos":[ ], "references":[ ]}, "expression":"EMPNO" }, {"@type": "fieldMap", "targetField":{"@type":"field", "name": "name", "type":"string", "uniqueName":"name", "label": "name", "parentObject":"employee/emp", "pcType": "NSTRING", "precision":255, "scale":0, "columnIndex":−1, "isKey":false, "isExternalId":false, "isSfldLookup":false, "isNullable":true, "isUnique":false, "isCreateable":false, "isUpdateable":true, "isFilterable":true, "isCalculated":false, "javaType":"java.lang.String", "showLabel":true, "naturalOrder":1, "linkedFields":["ENAME" ], "relatedInfos":[ ], "references":[ ]},"expression": "ENAME" }, {"@type":"fieldMap", "targetField": {"@type":"field", "name":"age", "type":"decimal", "uniqueName":"age", "label":"age", "parentObject":"employee/emp", "pcType":"DECIMAL", "precision":3, "scale":0,"columnIndex":−1, "isKey":false,"isExternalId": false, "isSfldLookup":false, "isNullable":true, "isUnique": false, "isCreateable":false, "isUpdateable":true, "isFilterable":true, "isCalculated":false, "javaType":"java.math.BigDecimal", "showLabel":true, "naturalOrder":2, "linkedFields":[ ], "relatedInfos":[ ], "references":[ ]}}, {"@type":"fieldMap", "targetField":{"@type":"field", "name":"city", "type":"string", "uniqueName":"city", "label":"city","parentObject":"employee/emp", "pcType": "NSTRING", "precision":50, "scale":0, "columnIndex":−1, "isKey":false, "isExternalId":false, "isSfldLookup":false, "isNullable":true, "isUnique":false, "isCreateable":false, "isUpdateable":true, "isFilterable":true, "isCalculated": false, "javaType":"java.lang.String", "showLabel":true, "naturalOrder":3, "linkedFields":[ ],"relatedInfos":[ ], "references":[ ]}}, {"@type":"fieldMap", "targetField": [{"@type":"field", "name":"salary", "type":"decimal", "uniqueName":"salary", "label":"salary", "parentObject": "employee/emp", "pcType":"DECIMAL", "precision":15, "scale":2, "columnIndex":−1, "isKey":false, "isExternalId": false, "isSfldLookup":false, "isNullable":true, "isUnique": false, "isCreateable":false, "isUpdateable":true, "isFilterable":true, "isCalculated":false, "javaType": "java.math.BigDecimal", "showlabel":true, "naturalOrder": 4,"linkedFields":["SAL"], "relatedInfos":[ ], "references":[ ]}, "expression":"SAL" }], "sourceFields": [{"@type":"field", "name":"EMPNO", "type":"decimal", "uniqueName":"EMPNO", "label":"EMPNO", "parentObject":"EMP", "pcType":"HIPRECDECIMAL", "precision": 4, "scale":0, "columnIndex":0, "isKey":true, "isExternalId":false, "isSfldLookup":false, "isNullable":false, "isUnique":true, "isCreateable":false, "isUpdateable":true, "isFilterable":true, "isCalculated":false, "showLabel":false, "naturalOrder":0, "linkedFields":["id"], "relatedInfos":[ ], "references":[ ]}, {"@type":"field", "name":"ENAME", "type":"varchar", "uniqueName":"ENAME", "label": "ENAME", "parentObject":"EMP", "pcType":"STRING", "precision":10,"scale":0, "columnIndex":1, "is Key":false, "isExternalId":false, "isSfldLookup":false, "isNullable": true, "isUnique":false, "isCreateable":false, "isUpdateable": true,"isFilterable":true, "isCalculated":false, "showLabel": false, "naturalOrder": 1, "linkedFields":["name"], "relatedInfos":[ ], "references":[ ]}, {"@type":"field", "name":"JOB", "type":"varchar", "uniqueName":"JOB", "label":"JOB", "parentObject":"EMP", "pcType": "STRING","precision":9, "scale":0, "columnIndex":2, "isKey":false, "ExternalId":false, "isSfldLookup":false, "isNullable":true, "isUnique":false, "isCreateable":false, "isUpdateable":true, "isFilterable":true, "isCalculated": false, "showlabel":false, "naturalOrder":2, "linkedFields":[ ] "relatedInfos":[ ], "references":[ ]}, {"@type": "field", "name":"MGR", "type":"decimal","uniqueName": "MGR", "label":"MGR", "parentObject":"EMP", "pcType":"HIPRECDECIMAL", "precision":4, "scale":0, "columnIndex":3, "isKey":false, "isExternalId":false, "isSfldLookup":false, "isNullable":true, "isUnique":false, "isCreateable":false, "isUpdateable":true, "isFilterable": true, "isCalculated":false, "showLabel":false, "naturalOrder":3,"linkedFields":[ ],"relatedInfos":[ ],"references":[ ]}, {"@type":"field", "name":"HIREDATE", "type": "timestamp", "uniqueName":"HIREDATE", "label": "HIREDATE", "parentObject":"EMP", "pc Type": "DATE", "precision":23, "scale":0, "columnIndex":4, "isKey":false, "isExternalId":false, "IsSfldLookup":false, "isNullable":true, "isUnique":false, "isCreateable":false, "isUpdateable":true, "isFilterable":true, "isCalculated": false, "showLabel":false, "naturalOrder":4, "linkedFields":[ ],"relatedInfos":[ ],"references":[ ]}, {"@type": "field", "name": "SAL", "type":"decimal", "uniqueName": "SAL", "label":"SAL", "parentObject":"EMP", "pcType": "HIPRECDECIMAL", "precision":7, "scale":2, "columnIndex":5, "isKey":false, "isExternalId":false, "isSfldLookup":false, "isNullable":true, "isUnique":false, "isCreateable":false, "isUpdateable":true, "isFilterable": true, "isCalculated":false, "showLabel":false, "naturalOrder":5,"linkedFields": ["salary"],"relatedInfos":[ ], "references":[ ]}, {"@type":"field", "name":"COMM","type": "decimal", "uniqueName":"COMM", "label":"COMM", "parentObject":"EMP", "pcType":"HIPRECDECIMAL", "precision":7, "scale":2, "columnIndex":6, "isKey":false, "isExternalId":false, "isSfldLookup":false, "isNullable": true, "isUnique":false, "isCreateable":false, "is Updateable":true, "isFilterable":true, "isCalculated":false, "showlabel":false, "naturalOrder":6, "linkedFields":[ ], "relatedInfos":[ ], "references":]]}, {"@type":"field", "name":"DEPTNO", "type":"decimal","uniqueName": "DEPTNO", "label":"DEPTNO", "parentObject":"EMP", "pcType":"HIPRECDECIMAL", "precision": 2, "scale":0, "columnIndex":7, "isKey":false, "isExternalId":false, "isSfldLookup":false, "isNullable":true, "isUnique":false, "isCreateable":false, "isUpdateable":true, "isFilterable": true, "isCalculated":false, "showLabel":false, "naturalOrder":7, "linkedFields":[ ], "relatedInfos":[ ], "references":[ ]}], "sortFields":[ ]},"groupFields":[ ]}

In one exemplary embodiment, during operation 2134, one or more topic subscriptions tasks may be generated in accordance with the following exemplary instructions, which may be instructions of a data integration tool, e.g., tool 112:

URI:/saas/api/v2/dsstask
Request Payload:
{"@type":"dssTask", "orgId":"010UQX", "name":"empSub", "description":" ", "createTime":"2019-09-22T11:45:58.000Z", "updateTime":"2019-11-17T13:08:11.000Z", "createdBy":"cihilabs", "updatedBy":"cihilabs", "maxLogs":10, "sourceConnectionId": "010UQX0B0000000-00002", "targetConnectionId":"010UQX0B0000000000-03", "targetObject": "EDC_TARGET_EMP", "targetObjectLabel":"EDC_TARGET_EMP", "operation":"Insert", "maxRoHs":0, "truncateTarget":false, "bulkApiDBTarget": false, "verbose":false, "targetMetadataUpdated":false, "modelVersion":"V3-R600", "queryAll":false, "srcSettings":{"@type":"taskDataSourceSetting", "isShowLabels":true, "isNaturalOrder":true}, "tgtSettings":{"@type": "taskDataSourceSetting", "isShowLabels":false, "isNaturalOrder":true}, "cfSettings":{"@type":"taskDataSourceSetting", "isShowLabels":false, "isNaturalOrder": false}, "bulkApi":false, "bulkApiSerialMode":false, "bulkApiMonitor":false, "isTargetObjectSfCustom":false, "allowNullUpdates":false, "targetBatchSize":200, "assignmentRuleId":"-1", "assignmentRuleType":"None", "createSuccessFile":false, "bulkApiHardDelete":false, "srcRun timeAttrs":{"@type":"taskRuntimeAttrs", "attrs":{"Cloud Integration Hub Batch interval":"1000", "CloudIntegration Hub Subscription name":"empSub" }}, "tgtRuntimeAttrs": {"@type":"taskRuntimeAttrs", "attrs":{ }}, "sourceObjects": [{"@type":"mObject", "name":"employee/emp", "label":"employee/emp", "metadataUpdated":false, "relations":[ ],"children":[ ]}],"advancedFilters":[ ], "filters":[ ], "fieldMaps":{"@type":"fieldMap", "targetField": {"@type":"field", "name":"EMPNO", "type":"decimal", "uniqueName":"EMPNO", "label":"EMPNO", "parentObject":"EDC_TARGET_EMP", "pcType":"HIPRECDECIMAL","precision":4, "scale":0, "columnIndex":0, "isKey": false, "isExternalId":false, "isSfldLookup":false, "isNullable":true, "isUnique":false, "isCreateable":false, "isUpdateable":true,"isFilterable":true,"isCalculated":false, "showLabel":false, "naturalOrder":0, "linkedFields":["id"], "relatedInfos":[ ], "references":[ ]}, "expression":"id"}, {"@type":"fieldMap", "targetField":{"@type":"field", "name":"ENAME", "type":"varchar","uniqueName":"ENAME", "label":"ENAME","parentObject":"EDC_TARGET_EMP", "pcType":"STRING", "precision":10, "scale":0, "columnIndex":1, "isKey":false, "isExternalId":false, "isSfldLookup":false, "isNullable":true, "isUnique":false, "isCreateable":false, "isUpdateable":true, "isFilterable": true, "isCalculated":false, "showLabel":false, "naturalOrder":1, "linkedFields":["name"], "relatedInfos":[ ], "references":[ ]}, "expression":"name"}, {"@type": "fieldMap","targetField":{"@type":"field", "name":"JOB", "type":"varchar", "uniqueName":"JOB", "label":"JOB", "parentObject":"EDC_TARGET_EMP", "pcType": "STRING", "precision":9, "scale":0, "columnIndex":2, "isKey":false, "isExternalId":false, "isSfldLookup":false, "isNullable":true, "isUnique":false, "isCreateable":false, "isUpdateable":true, "isFilterable":true,"isCalculated": false, "showLabel":false, "naturalOrder":2, "linkedFields":[ ],"relatedInfos":[ ], "references":[ ]}}, {"@type": "fieldMap", "targetField":{"@type":"field","name": "MGR", "type":"decimal","uniqueName":"MGR", "label": "MGR", "parentObject":"EDC_TARGET_EMP", "pcType":"HIPRECDECIMAL", "precision":4, "scale":0, "columnIndex":3, "isKey":false, "isExternalId":false, "isSfldLookup":false, "isNullable":true, "isUnique":false, "isCreateable":false, "isUpdateable":true, "isFilterable": true, "isCalculated":false, "showLabel":false, "naturalOrder":3, "linkedFields":[ ], "relatedInfos":[ ], "references":[ ]}}, {"@type":"fieldMap", "targetField": {"@type":"field", "name":"HIREDATE", "type": "timestamp", "uniqueName":"HIREDATE", "label": "HIREDATE", "parentObject":"EDC_TARGET_EMP", "pcType":"DATE", "precision":23, "scale":3, "columnIndex":4, "isKey":false, "isExternalId":false, "isSfldLookup": false, "isNullable":true, "isUnique":false, "isCreateable": false, "isUpdateable":true, "isFilterable":true, "isCalculated":false, "showLabel":false, "naturalOrder":4, "linkedFields":[ ], "relatedInfos":[ ], "references":[ ]}}, {"@type":"fieldMap", "targetField":{"@type":"field", "name":"SAL", "type":"decimal", "uniqueName":"SAL", "label":"SAL", "parentObject": "EDC_TARGET_EMP", "pcType":"HIPRECDECIMAL", "precision":7, "scale":2, "columnIndex": 5, "isKey":false, "isExternalId":false, "isSfldLookup":false, "isNullable":true, "isUnique":false, "isCreateable":false, "isUpdateable":true, "isFilterable": true, "isCalculated":false, "showLabel":false, "naturalOrder":5, "linkedFields":["salary"], "relatedInfos":"references":[ ]}, "expression":"salary"}, {"@type":"fieldMap", "targetField":{"@type":"field", "name":"COMM", "type": "decimal","uniqueName":"COMM", "label":"COMM", "parentObject":"EDC_TARGET_EMP", "pcType": "HIPRECDECIMAL", "precision":7, "scale":2, "columnIndex":6, "isKey":false, "isExternalId":false,"isSfldLookup": false, "isNuliable":true, "isUnique":false, "isCreateable": false, "isUpdateable":true, "isFilterable":true, "isCalculated":false, "showLabel":false, "naturalOrder":6, "linkedFields":[ ],"relatedInfos":[ ], "references":[]}}, {"@type":"fieldMap", "targetField":{"@type":"field", "name": "DEPTNO", "type":"decimal", "uniqueName": "DEPTNO", "label":"DEPTNO", "parentObject": "EDC_TARGET_EMP", "pcType":"HIPRECDECIMAL", "precision":2, "scale":0, "columnIndex":7,"isKey":false, "isExternalId":false, "isSfldLookup":false, "isNullable": true, "isUnique":false, "isCreateable":false, "isUpdateable": true, "isFilterable":true, "isCalculated":false, "showLabel": false, "naturalOrder":7, "linkedFields":[ ], "relatedInfos":[ ], "references":[ ]}}], "sourceFields":[{"@type": "field", "name":"id", "type":"long", "uniqueName":"id", "label":"id", "parentObject":"employee/emp", "pcType": "BIGINT", "precision":19, "scale":1, "columnIndex":-1, "isKey":false, "isExternalId":false, "isSfldLookup":false, "isNullable":true, "is Unique":false, "isCreateable":false, "isUpdateable":true, "isFilterable":true, "isCalculated": false, "javaType":"java.lang.Long", "showlabel":true, "naturalOrder":0, "linkedFields":["EMPNO"], "relatedInfos":[ ], "references":[ ]}, {"@type":"field", "name": "name", "type":"string", "uniqueName":"name", "label": "name", "parentObject":"employee/emp", "pcType": "NSTRING", "precision":255, "scale":0, "column Index":-1, "isKey":false, "isExternalId":false, "isSfld- Lookup"-:false, "isNullable":true, "isUnique": false, "isCreateable":false, "isUpdateable":true, "isFilterable": true, "isCalculated":false, "javaType": "java.lang.String", "showLabel":true, "naturalOrder":1, "linkedFields": ["ENAME"], "relatedInfos":[ ], "references":[ ]}, {"@type":"field", "name":"age", "type":"decimal", "uniqueName":"age","label":"age", "parentObject":"employee/emp", "pcType":"DECIMAL", "precision":3, "scale":0, "columnIndex":-1, "isKey":false, "isExternalId": false, "isSfldLookup":false, "isNullable":true, "isUnique": false, "isCreateable":false, "isUpdateable":true, "isFilterable":true, "isCalculated":false, "javaType": "java.math.BigDecimal", "showLabel":true, "naturalOrder":2, "linkedFields":[ ], "relatedInfos":[ ]:"references":[ ]}, {"@type":"field", "name":"city", "type":"string", "uniqueName":"city", "label":"city", "parentObject":"employee/emp", "pcType":"NSTRING", "precision": 50, "scale":0, "columnIndex":-1, "iskey":false, "isExternalId":false, "isSfldLookup":false, "isNullable": true, "isUnique":false, "isCreateable":false,"isUpdateable": true, "isFilterable":true, "isCalculated":false, "javaType": "java.lang.String", "showLabel":true, "naturalOrder":3, "linkedFields":[ ], "relatedInfos":[ ], "references":[ ]}, {"@type":"field", "name":"salary", "type":"decimal", "uniqueName":"salary","label":"salary", "parentObject": "employee/emp","pcType":"DECIMAL","precision":15, "scale":2, "columnIndex":-1, "isKey":false, "isExternalId": false, "isSfldLookup":false, "isNullable":true, "is Unique": false, "isCreateable":false, "isUpdateable":true, "isFilterable":true,"isCalculated":false, "javaType":"java.math. BigDecimal", "showLabel":true, "naturalOrder":4, "linkedFields":["SAL"], "relatedInfos":[ ],"references":[ ]}, {"@type":"field", "name":"DIH_PUBLICATION_INSTANCE_DATE", "type":"datetime", "uniqueName": "DIH_PUBLICATION_INSTANCE_DATE", "label": "DIH_PUBUCATION_INSTANCE_DATE", "parentObject":"employee/emp", "pcType":"TOOLKIT_DATETIME", "precision":26, "scale":0, "columnIndex":-1, "isKey":false, "isExternalId":false, "isSfldLookup":false, "isNuliable":true, "isUnique":false, "isCreateable":false, "isUpdateable":true, "isFilterable":true, "isCalculated": false, "java Type":"java.sql.Timestamp", "showlabel":true, "naturalOrder":5, "linkedFields":[ ],"relatedInfos":[ ], "references":[ ]}, {"@type":"field", "name":"DIH_PUBLICATION_INSTANCE_ID", "type":"string", "uniqueName": "DIH_PUBLICATION_INSTANCE_ID", "label":"DIH_ PUBLICATION_INSTANCE_ID", "parentObject":"employee/emp", "pcType":"NSTRING", "precision":19, "scale":0, "columnIndex":-1, "isKey":false, "isExternalId": false, "isSfldLookup":false, "isNuliable":true, "isUnique": false, "isCreateable":false, "isUpdateable":true,"isFilterable":true, "isCalculated":false, "javaType": "java.lang.String", "show Label":true, "naturalOrder":6, "linkedFields":[ ], "relatedInfos":[ ], "references":[ ]}], "sortFields":[ ], "groupFields":[ ]}

Figure 24:
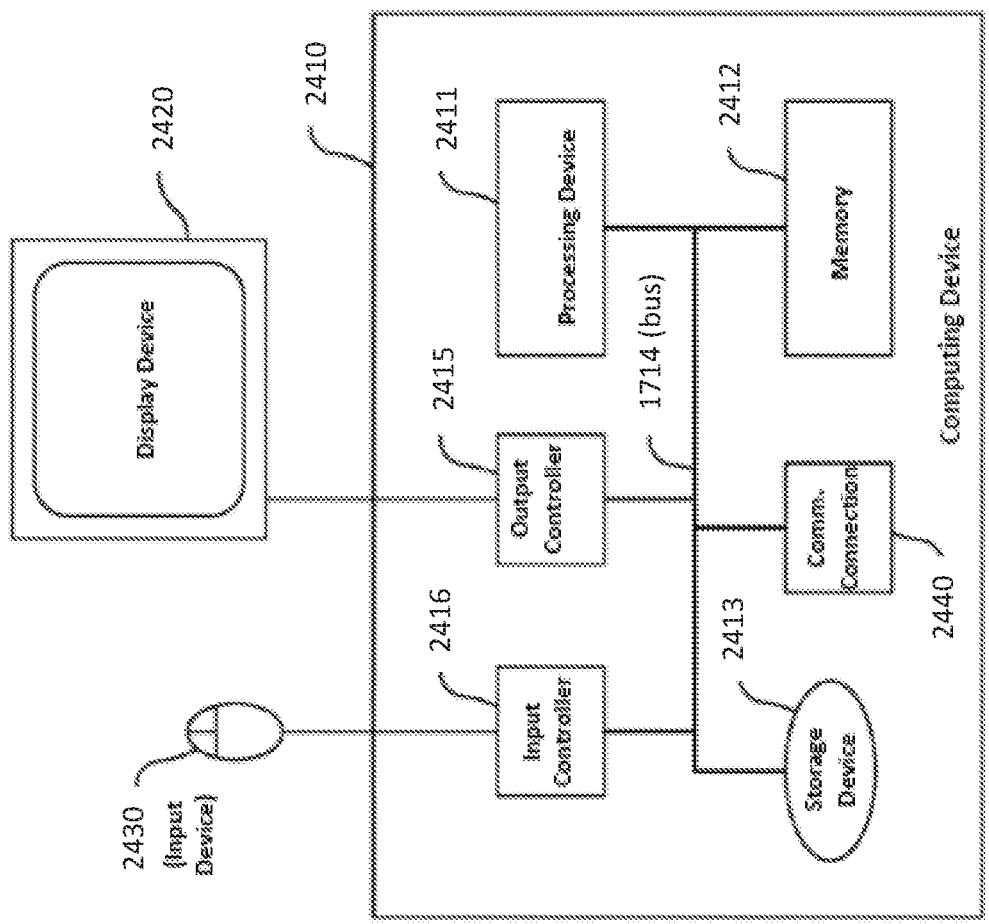
FIG. 24 is functional diagram of a computer processing machine in accordance with this disclosure.

FIG. 24 illustrates a computing device 2410 in accordance with this disclosure, which includes a processing device 2411, e.g., which may serve as processor 118, memory 2412, a bus network 2414, an output controller 2415 providing output to an output device 2420, such as a display or a printer (not particularly illustrated), a storage device 2413, a communications connection 2440, e.g., for wireless or wired connectivity, and an input controller 2416 for receiving user input, e.g., via a user device 2430. In some embodiments, computer software instructions are retrieve from storage device 2413 by processing device 2411 via bus 2414 and stored in memory 2412, from which processing device 2411 executes such instructions causing computing device 2410 overall to carry out various techniques in accordance with this disclosure. For example, instructions for a pub/sub engine 122b may be configured to, among other things, carry out one or more of processes 300, 400, 1500, or 1600, or variations thereof in accordance with this disclosure. Upon reading this disclosure in its entirety, one will appreciate how to configure computer software instructions to carry out operations in accordance with this disclosure using a variety of computer software languages interacting with various data stores and various components of a computing device, e.g. computing device 2410 that is integrated, e.g. via a network, with a data store, e.g., data store 102.

We claim:

1. A method executed by one or more computer processors for optimizing a plurality of data integration tasks within a data integration collection describing data integration tasks within a data store, the method comprising:
   accessing, using at least one computer processor in the one or more computer processors, a data integration collection describing a plurality of data integration tasks defining a migration of data between at least one source data store and at least one target data store;
   identifying, using the at least one computer processor, as a sub-set of the plurality of data integration tasks, a plurality of point-to-point data integration tasks each corresponding to a respective data source and a respective target;
   defining; using the at least one computer processor, a data integration transformation plan to include:
      generating one or more publication data integration tasks comprising publishing from each respective data source of the plurality of point-to-point data integration tasks to generate a single publication topic; and
      generating one or more subscription data integration tasks causing each respective target of the plurality of point-to-point data integration tasks to subscribe to the single publication topic; and
   generating, using the at least one computer processor, a set of optimization instructions configured to cause the at least one computer processor to carry out the data integration transformation plan.

2. The method of claim 1, further comprising executing, using the at least one computer processor, the set of optimization instructions to generate the one or more publication data integration tasks and the one or more subscription data integration tasks.

3. The method of claim 1, wherein generating a data integration transformation plan includes generating at least one of:
   a source integration map comprising at least one first key value pairs, the at least one first key value pair comprising a first key generated by applying a hash function to at least one respective data source and at least one first value describing one or more integration tasks associated with the at least one respective data source; or
   a target integration comprising at least one second key value pair, the at least one second key value pair comprising a second key generated by applying a hash function to at least one respective data target and at least one first value describing one or more integration tasks associated with the at least one respective data target.

4. The method of claim 3, wherein generating a data integration transformation plan further includes:

generating the single publication topic based on the at least one first key value pair or the at least one second key value pair.

5. The method of claim 1, wherein the single publication topic is deleted after the one or more subscription data integration tasks execute or wherein the data integration transformation plan further includes deleting the plurality of point-to-point data integration tasks.

6. The method of claim 1, wherein the plurality of point-to-point data integration tasks include:
   a first target obtaining or receiving first data from a first source; and
   a second target obtaining or receiving second data from the first source;
   wherein the one or more publication data integration tasks include publishing the first data and the second data from the first source thereby generating the single publication topic; and
   wherein the one or more subscription data integration tasks includes the first target and the second target subscribing to the single publication topic.

7. The method of claim 1, wherein the plurality of point-to-point data integration tasks include:
   a first target obtaining or receiving first data from a first source;
   the first target obtaining or receiving second data from a second source; and
   the first target obtaining or receiving third data from a third source;
   wherein the one or more publication data integration tasks include: publishing the first data from the first source to the single publication topic; publishing the second data from the second source to the single publication topic; and publishing the third data from the third source to the single publication topic; and
   wherein the one or more subscription data integration tasks include the first target subscribing to the single publication topic.

8. The method of claim 7, wherein the plurality of point-to-point data integration tasks include:
   a second target obtaining or receiving transformed third data obtained from the first source;
   wherein the one or more subscription data integration tasks include the second target subscribing to the single publication topic and wherein the one or more subscription integration tasks include performing a data transformation upon the third data to obtain transformed third data.

9. The method of claim 1, wherein the plurality of point-to-point data integration tasks include:
   a first target obtaining or receiving first data from a first source;
   a second target obtaining or receiving first data from the first target; and
   a third target obtaining or receiving first data from the first source;
   wherein the one or more publication data integration tasks include publishing the first data from the first source to the single publication topic; and
   wherein the one or more subscription data integration tasks include the first target and the second target subscribing to the single publication topic.

10. The method of claim 1; wherein generating one or more publication data integration tasks includes for each respective publication data integration task specifying a repository for the single publication topic and a publication schedule specifying when each respective publication data integration tasks causes respective data from a respective data source to be published to the single publication topic within the repository, and wherein generating one or more subscription data integration tasks includes for each respective subscription data integration tasks specifying when each respective subscription data integration tasks causes a respective target to retrieve or obtain respective subscribed data from the single publication topic.

11. The method of claim 1, further comprising:
    generating a human readable interface describing the data integration transformation plan; presenting the human readable interface to a user; and
    requesting modification or acceptance of the data integration transformation plan;
    wherein the generating step and the executing step are responsive to receiving acceptance of the data integration transformation plan from the user.

12. A system for optimizing a plurality of data integration tasks within a data integration collection of a data store, the system comprising:
    one or more processors coupled to a non-transitory data store storing instructions which when executed by the one or more processors cause the one or more processors to perform operations including:
       identifying as a sub-set of the plurality of data integration tasks, a plurality of point-to-point data integration tasks;
       defining a data integration transformation plan to include:
          generating one or more publication data integration tasks comprising publishing from each respective data source of the plurality of point-to-point data integration tasks to generate a single publication topic; and
          generating one or more subscription data integration tasks causing each respective target of the plurality of point-to-point data integration tasks to subscribe to the publication topic;
       generating a set of optimization instructions configured to cause the one or more processors to carry out the data integration transformation plan; and
       executing the set of optimization instructions to generate the one or more publication data integration tasks and the one or more subscription data integration tasks.

13. The system of claim 12, wherein the data integration transformation plan further includes deleting the plurality of point-to-point data integration tasks.

14. The system of claim 12, wherein the commonality is one or more of a same target and a same data source.

15. The system of claim 12, wherein the plurality of point-to-point data integration tasks include:
    a first target obtaining or receiving first data from a first source; and
    a second target obtaining or receiving second data from the first source;
    wherein the one or more publication data integration tasks include publishing the first data and the second data from the first source thereby generating the single publication topic; and
    wherein the one or more subscription data integration tasks includes the first target and the second target subscribing to the single publication topic.

16. The system of claim 12, wherein the plurality of point-to-point data integration tasks include:
    a first target obtaining or receiving first data from a first source;

the first target obtaining or receiving second data from a second source; and the first target obtaining or receiving third data from a third source;

wherein the one or more publication data integration tasks include: publishing the first data from the first source to the single publication topic; publishing the second data from the second source to the single publication topic; and publishing the third data from the third source to the single publication topic; and wherein the one or more subscription data integration tasks include the first target subscribing to the single publication topic.

17. The system of claim 12, wherein the plurality of point-to-point data integration tasks include:

a second target obtaining or receiving transformed third data obtained from the first source;

wherein the one or more publication integration tasks include performing a data transformation upon the third data to obtain transformed third data and publishing the transformed third data to the single publication topic; and wherein the one or more subscription data integration tasks include the second target subscribing to the single publication topic.

18. The system of claim 12, wherein the plurality of point-to-point data integration tasks include:

a first target obtaining or receiving first data from a first source;

a second target obtaining or receiving first data from the first target; and a third target obtaining or receiving first data from the first source;

wherein the one or more publication data integration tasks include publishing the first data from the first source to the single publication topic; and wherein the one or more subscription data integration tasks include the first target and the second target subscribing to the single publication topic.

19. The system of claim 12, wherein generating one or more publication data integration tasks includes for each respective publication data integration task specifying a repository for the single publication topic and a publication schedule specifying when each respective publication data integration tasks causes respective data from a respective data source to be published to the single publication topic within the repository, and wherein generating one or more subscription data integration tasks includes for each respective subscription data integration tasks specifying when each respective subscription data integration tasks causes a respective target to retrieve or obtain respective subscribed data from the single publication topic.

20. A non-transitory data store storing instructions for optimizing a plurality of data integration tasks within a data integration collection, which when executed by one or more computer processors cause the one or more computer processors to carry out operations comprising:

identifying as a sub-set of the plurality of data integration tasks, a plurality of point-to-point data integration tasks;

defining a data integration transformation plan to include:

generating one or more publication data integration tasks comprising publishing from each respective data source of the plurality of point-to-point data integration tasks to generate a single publication topic; and generating one or more subscription data integration tasks causing each respective target of the plurality of point-to-point data integration tasks to subscribe to the publication topic;

generating a set of optimization instructions configured to cause the one or more computer processors to carry out the data integration transformation plan; and executing the set of optimization instructions to generate the one or more publication data integration tasks and the one or more subscription data integration tasks.

* * * * *